(12) United States Patent
Adachi et al.

(10) Patent No.: US 11,136,241 B2
(45) Date of Patent: Oct. 5, 2021

(54) HEAT RAY SHIELDING FINE PARTICLES, HEAT RAY SHIELDING FINE PARTICLE DISPERSION LIQUID, COATING LIQUID FOR HEAT RAY SHIELDING LAYER, AND HEAT RAY SHIELDING LAYER, HEAT RAY SHIELDING RESIN FILM, HEAT RAY SHIELDING DISPERSION BODY USING THEM

(71) Applicant: SUMITOMO METAL MINING CO., LTD., Tokyo (JP)

(72) Inventors: Kenji Adachi, Ichikawa (JP); Satoshi Yoshio, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 217 days.

(21) Appl. No.: 16/489,480

(22) PCT Filed: Nov. 22, 2017

(86) PCT No.: PCT/JP2017/042097
§ 371 (c)(1),
(2) Date: Aug. 28, 2019

(87) PCT Pub. No.: WO2018/159029
PCT Pub. Date: Sep. 7, 2018

(65) Prior Publication Data
US 2020/0048101 A1    Feb. 13, 2020

(30) Foreign Application Priority Data
Feb. 28, 2017 (JP) .............................. JP2017-037539

(51) Int. Cl.
*C01B 35/04* (2006.01)
*C09D 17/00* (2006.01)
(Continued)

(52) U.S. Cl.
CPC ................ *C01B 35/04* (2013.01); *C09D 5/32* (2013.01); *C09D 7/67* (2018.01); *C09D 7/68* (2018.01);
(Continued)

(58) Field of Classification Search
CPC .................................................... C01B 35/026
See application file for complete search history.

(56) References Cited

U.S. PATENT DOCUMENTS 6,060,154 A   5/2000  Adachi et al.
6,319,613 B1  11/2001 Takeda et al.
(Continued)

FOREIGN PATENT DOCUMENTS

JP   H02-136230 A   5/1990
JP   2000-169765 A  6/2000
(Continued)

OTHER PUBLICATIONS

Nishikawa, Hiroshi, "Powder or Boron Compound at Present," Ceramics, vol. 22, No. 1, 1987, pp. 40-45.
(Continued)

*Primary Examiner* — Alexandre F Ferre
(74) *Attorney, Agent, or Firm* — Oliff PLC

(57) ABSTRACT

Heat ray shielding fine particles contain calcium lanthanum boride fine particles represented by a general formula $Ca_xLa_{1-x}B_m$, a shape of each fine particle of the calcium lanthanum boride fine particles satisfies at least one of the following: 1) when scattering intensity of the calcium lanthanum boride fine particles diluted and dispersed in a solvent is measured using small-angle X-ray scattering, value Ve of a slope of a straight line is $-3.8 \leq Ve \leq -1.5$, 2) the particle shape is a flat cylindrical shape, or a flat spheroidal (Continued)

(wherein a length of a long axis is d and a length of a short axis is h) shape, with a value of aspect ratio d/h being $1.5 \leq d/h \leq 20$.

16 Claims, 1 Drawing Sheet

(51) Int. Cl.
  *C09D 5/32* (2006.01)
  *C09D 7/40* (2018.01)
(52) U.S. Cl.
  CPC ............ *C09D 7/70* (2018.01); *C09D 17/004* (2013.01); *C01P 2004/12* (2013.01); *C01P 2004/32* (2013.01); *C01P 2004/54* (2013.01); *C01P 2004/62* (2013.01); *C01P 2004/64* (2013.01)

(56) References Cited

U.S. PATENT DOCUMENTS

2006/0178254 A1  8/2006  Takeda et al.
2017/0283311 A1  10/2017 Machida et al.

FOREIGN PATENT DOCUMENTS

| JP | 2007-154152 A | 6/2007 |
| JP | 4058822 B2 | 3/2008 |
| JP | 4096205 B2 | 6/2008 |
| JP | 4096277 B2 | 6/2008 |
| WO | 2016/031969 A1 | 3/2016 |

OTHER PUBLICATIONS

Doi, Hiroshi, "Lanthanum Hexa-Boride Powder—Properties and Preparation Method-," Powder and Industry, 21 (5) 1989, pp. 66-70.
Yoshio, Satoshi et al., "Optical properties of group-3 metal hexaboride nanoparticles by first-principles calculations". The Journal of Chemical Physics, vol. 144, pp. 234702-1 to 234702-11, 2016.
Machida, Keisuke et al. "Particle shape inhomogeneity and plasmon-band broadening of solar-control LaB6 nanoparticles". Journal of Applied Physics, vol. 118, pp. 013103-1 to 013103-10, 2015.
Jan. 16, 2018 International Search Report issued in International Patent Application No. PCT/JP2017/042097.
Bao, Lihong et al., "Structural, magnetic, and thermionic emission properties of multi-functional La1-xCaxB6 hexaboride" Journal of Alloys and Compounds, vol. 731, pp. 332-338, 2018.
D.P. Young et al., "High-temperature weak ferromagnetism in a low-density free-election gas" Nature, vol. 397, 1999.
Takao Mori et al., "Ferromagnetism in lanthanum doped CaB6: is it intrinsic?" Solid State Communications, vol. 123, pp. 287-290, 2002.
Jan. 15, 2021 Extended European Search Report issued in European Patent Application No. 17899026.3.

HEAT RAY SHIELDING FINE PARTICLES, HEAT RAY SHIELDING FINE PARTICLE DISPERSION LIQUID, COATING LIQUID FOR HEAT RAY SHIELDING LAYER, AND HEAT RAY SHIELDING LAYER, HEAT RAY SHIELDING RESIN FILM, HEAT RAY SHIELDING DISPERSION BODY USING THEM

TECHNICAL FIELD

The present invention relates to heat ray shielding fine particles capable of forming a heat ray shielding layer having good visible light transmittance and excellent heat ray shielding properties, a heat ray shielding fine particle dispersion liquid using the heat ray shielding fine particles, a coating liquid for a heat ray shielding layer, and a heat ray shielding layer, a heat ray shielding resin film, and a heat ray shielding fine particle dispersion body obtained by using them.

DESCRIPTION OF RELATED ART

Various techniques have been proposed as a heat ray shielding technique that absorbs heat ray while maintaining good visible light transmittance and transparency. For example, the heat ray shielding technique using a dispersion body of conductive fine particles has a merit that it has excellent heat ray shielding properties at a low cost, radio wave transparency, and high weather resistance, compared with other techniques.

For example, patent document 1 discloses an infrared absorptive synthetic resin molded product obtained by molding a transparent resin containing tin oxide fine powder in a dispersed state into a sheet or a film shape and laminating it integrally on a transparent or translucent resin base material. The infrared absorptive synthetic resin molded product having the above configuration absorbs a light on a longer wavelength side than an infrared region in the sunlight, and blocks transmission of the light, by an action of $SnO_2$ fine powder contained in a dispersed state in its thickness. Therefore, when this is used as a daylighting material, temperature rise in a room is reduced. Further, patent document 1 also discloses that since $SnO_2$ itself has conductivity, surface electrical resistance is lowered and antistatic property is also imparted.

Further, patent document 2 discloses a dispersion liquid, a coating material, and a paste in which antimony tin oxide (ATO) powder and indium tin oxide (ITO) powder are dispersed, or a heat ray-cut composition such as a coating layer or a film formed by the above materials, and discloses that the obtained heat ray cut composition has an advantage of an excellent heat-ray shielding effect and weather resistance, and has a low haze.

Further, patent document 3 discloses a heat shielding liquid and a coating layer containing fine particles such as $LaB_6$, TiN, FeOOH, $RuO_2$ and patent document 4 discloses a coating liquid for a solar radiation shielding layer in which boride fine particles each having a particle size of 200 nm or less (general formula $XB_6$, wherein X is at least one of Ce, Gd, Tb, Dy, Ho, Y, Eu, Er, Er, Tm, Lu, Sr, Ca) are mixed and dispersed in the solution, together with a binder.

Further, patent document 5 discloses that infrared shielding material particles are obtained by increasing an amount of free electrons of tungsten oxide fine particles and/or complex tungsten oxide fine particles contained in an infrared shielding material, and decreasing a particle size of these fine particles to 1 nm or more and 800 nm or less, and discloses that a layer produced by dispersing the infrared shielding material fine particles in an appropriate medium is excellent in visible light transmittance and near infrared absorption ability, and has a solar radiation shielding performance superior to the above-described boride and ITO.

PRIOR ART DOCUMENT

Patent Document

[Patent Document 1] Japanese Patent Application Publication No. 1990-136230
[Patent Document 2] Japanese Patent Application Publication No. 2007-154152
[Patent Document 3] Japanese Patent No. 4058822
[Patent Document 4] Japanese Patent No. 4096277
[Patent Document 5] Japanese Patent No. 4096205

Non-Patent Document

[Non-Patent Document 1] Satoshi Yoshio, Koichiro Maki and Kenji Adachi, "Optical properties of group-3 metal hexaboride nanoparticles by first-principles calculations", J. Chem. Phys., Vol. 144, 234702 (2016)
[Non-patent document 2] K. Machida and K. Adachi, "Particle shape inhomogeneity and plasma band broadening of solar-control LaB6 nanoparticles", J. Appl. Phys., 118, 013103 (2015)
[Non-Patent Document 3] Ceramics, 22 volumes, 1987, pp 40-45 by Hiroshi Nishikawa
[Non-patent document 4] Powder and industry, 21 (5) 1989 by Doi

SUMMARY OF THE INVENTION

Problem to be Solved by the Invention

However, according to the study by the present inventors, the infrared absorptive synthetic resin molded product proposed in Patent Document 1 is formed by molding a transparent synthetic resin containing fine $SnO_2$ powder in a dispersed state into various shapes. Then, $SnO_2$ is a blue fine powder with a particle size of 0.02 to 0.2 μm. Therefore, the more the $SnO_2$ fine powder is added to the transparent or translucent synthetic resin, the larger the shielding effect of light on the longer wavelength side than infrared region, but transmission of the light in the visible range becomes low. Therefore, this infrared adsorptive synthetic resin molded product involves a problem that heat ray shielding performance is not sufficient when high visible light transmittance is required.

Further, ITO material disclosed in patent document 2 is expensive because it contains In, and involves a problem that it does not necessarily have a large absorption effect for the shielding of the light in the near infrared region of wavelength 1000 nm or less, where intensity is the highest among sunlight.

On the other hand, a nitrogen compound and a boride fine particle dispersion substance proposed in patent documents 3 and 4 have greatly improved shielding performance when used as a heat ray shielding material. Above all, lanthanum hexaboride has a strong absorbing power for shielding of the sunlight in the near infrared region of a wavelength of 1000 nm or less. However, these nitrogen compound and boride fine particle dispersion substance have considerable absorption at visible wavelengths, and involve a problem that they become a transparent layer colored in almost green when used as a heat ray shielding layer.

Tungsten oxide fine particles and/or complex tungsten oxide fine particles proposed in patent document 5 has a greatly improved transmissivity of light of visible wavelength while cutting light of near infrared wavelength adjacent to visible light, although leaving a slight bluish, and has a profile close to an ideal as an absorption type heat ray shielding layer, but exhibits weak photochromic properties such as blue coloration by irradiation with short wavelength light, and has environmental instability such as degradation of a shielding function due to reaction to moisture, and therefore involves a problem that cost is required for taking measures to prevent the above problem.

The present invention is provided under the above-described circumstance, and an object of the present invention is to provide heat-ray shielding fine particles having high visible light transmittance and at the same time excellent heat ray shielding effect and stable weather resistance, heat ray shielding fine particle dispersion liquid and coating liquid for a heat ray shielding layer using the heat ray shielding fine particles, and a heat ray shielding layer, a heat ray shielding resin film, and a heat ray shielding fine particle dispersion body using these liquids.

Means for Solving the Problem

In order to solve the above-described problem, the present inventors conducted intensive research, and obtain finding such that fine particles of a predetermined shape containing calcium-lanthanum boride represented by a general formula $Ca_xLa_{1-x}B_m$ (satisfying $0.001 \leq x \leq 0.800$, $5.0 \leq m < 6.3$) has a strong heat absorbing effect and at the same time has a broad visible transmission and stable weather resistance.

Namely, a first invention of the present invention provides heat ray shielding fine particles containing calcium lanthanum boride fine particles represented by a general formula $Ca_xLa_{1-x}B_m$, wherein a value of x in the general formula is $0.001 \leq x \leq 0.800$, and a value of m is $5.0 \leq m < 6.3$, an average dispersed particle size of the calcium lanthanum boride fine particles is 1 nm or more and 800 nm or less, a shape of each fine particle of the calcium lanthanum boride fine particles satisfies at least one of the following:

1) when scattering intensity of the calcium lanthanum boride fine particles diluted and dispersed in a solvent is measured using small-angle X-ray scattering, value Ve of a slope of a straight line is $-3.8 \leq Ve \leq -1.5$, which is obtained by double-logarithmic plotting of a relationship between scattering vector $q = 4\pi \sin \theta / \lambda$ and scattering intensity I (q), 2) the particle shape is a flat cylindrical (wherein a diameter of a bottom circle is d and a height of the cylinder is h) shape, or flat spheroidal (wherein a length of a long axis is d and a length of a short axis is h) shape, with a value of aspect ratio d/h being $1.5 \leq d/h \leq 20$.

A second invention provides the heat ray shielding fine particles according to the first invention, wherein a value of x in the general formula is $0.100 \leq x \leq 0.625$, and a value of m is $5.0 \leq m < 6.3$.

A third invention provides the heat ray shielding fine particles containing the calcium lanthanum boride fine particles of the first or second invention, which are two or more kinds of calcium lanthanum boride fine particles having different values of x in the above general formula.

A fourth invention provides a heat ray shielding fine particle dispersion liquid, which is a dispersion liquid containing the heat ray shielding particles of any of the first to third inventions dispersed in a liquid medium, wherein the liquid medium is one or more selected from water, organic solvents, fats and oils, liquid resins, and liquid plasticizers for plastics.

A fifth invention provides the heat ray shielding particle dispersion liquid according to the fourth invention, wherein the heat ray shielding particles are contained in an amount of 0.02 mass % or more and 20 mass % or less.

A sixth invention provides a coating liquid for a heat ray shielding layer, wherein a binder containing one or more selected from UV curable resin, room temperature curable resin, thermoplastic resin, or partial hydrolysis polymer of alkoxide is added to the heat ray shielding fine particle dispersion liquid according to the fourth or fifth invention, and a content of the heat ray shielding particles is 0.8 mass % or more and 10.0 mass % or less.

A seventh invention provides a heat ray shielding layer, which is formed by applying the coating liquid for a heat ray shielding layer of the sixth invention on one side or both sides of a base material.

An eighth invention provides a heat ray shielding resin film in which the heat ray shielding layer according to the seventh invention is formed on one side or both sides of a base material, wherein the base material is a resin film, and resin of the resin film is one or more selected from polycarbonate resin, poly (meth) acrylic ester resin, saturated polyester resin, and cyclic olefin resin.

A ninth invention provides the heat ray shielding resin film according to the eighth invention, wherein an adhesive layer for adhesion is provided on at least one side of the resin film.

A tenth invention provides the heat ray shielding resin film according to the ninth invention, wherein the adhesive layer for adhesion contains the heat ray shielding particles according to any one of the first to third inventions.

An eleventh invention provides the heat ray shielding resin film according to any one of the eighth to tenth inventions, wherein a surface resistance value of the heat ray shielding layer or the adhesive layer for adhesion containing the heat ray shielding particles is $10^6 \Omega/\square$ or more.

A twelfth invention provides a heat ray shielding fine particle dispersion body wherein the heat ray shielding fine particles according to any of the first to third inventions are dispersed in a thermoplastic resin or a UV curable resin.

A thirteenth invention provides a heat ray shielding fine particle dispersion body according to the twelfth invention, wherein the thermoplastic resin is one of the resins selected from a group of polyethylene terephthalate resin, polycarbonate resin, acrylic resin, styrene resin, polyamide resin, polyethylene resin, vinyl chloride resin, olefin resin, epoxy resin, polyimide resin, fluorine resin, ethylene/vinyl acetate copolymer, and polyvinyl acetal resin, or the mixture of two or more resins selected from the above resin group, or a copolymer of two or more resins selected from the above resin group.

A fourteenth invention provides the heat ray shielding fine particle dispersion body of the twelfth or thirteenth invention, which contains 0.001 mass % or more and 80.0 mass % or less of the heat ray shielding fine particles.

A fifteenth invention provides the heat ray shielding fine particle dispersion body according to any one of the twelfth to fourteenth inventions, wherein the heat ray shielding fine particle dispersion body has a sheet shape, a board shape or a film shape.

A sixteenth invention provides the heat ray shielding fine particle dispersion body according to any one of the twelfth to fifteenth inventions, wherein a content of the heat ray shielding particles is 0.01 g/m$^2$ or more and 0.5 g/m$^2$ or less per unit projected area contained in the heat ray shielding particle dispersion body.

Advantage of the Invention

Heat ray shielding particles, heat ray shielding fine particle dispersion liquid, heat ray shielding layer coating liquid using the heat ray shielding particles, and a heat ray shielding layer, a heat ray shielding resin film, and a heat ray shielding fine particle dispersion body using them according to the present invention, has sufficient characteristics as a heat ray shielding material to widely shield a heat ray component contained in sunlight, and has a high visible light transmittance and stable weather resistance (oxidation resistance, water resistance, moisture resistance, UV resistance).

DETAILED DESCRIPTION OF THE INVENTION

Embodiments of heat ray shielding particles, heat ray shielding particle dispersion liquid, coating liquid for a heat ray shielding layer, a heat ray shielding layer, a heat ray shielding resin film, and heat ray shielding particle dispersion body using them according to the present invention, will be described in an order of [a] Calcium lanthanum boride fine particles, [b] Method for producing calcium lanthanum boride fine particles, [c] Heat ray shielding fine particle dispersion liquid and a method for producing the same, [d] Coating liquid for a heat ray shielding layer and a heat ray shielding layer, a heat ray shielding resin film and a method for producing them, [e] Heat ray shielding particle dispersion body and a method for producing the same.

[a] Calcium Lanthanum Boride Fine Particles

Figure 1:
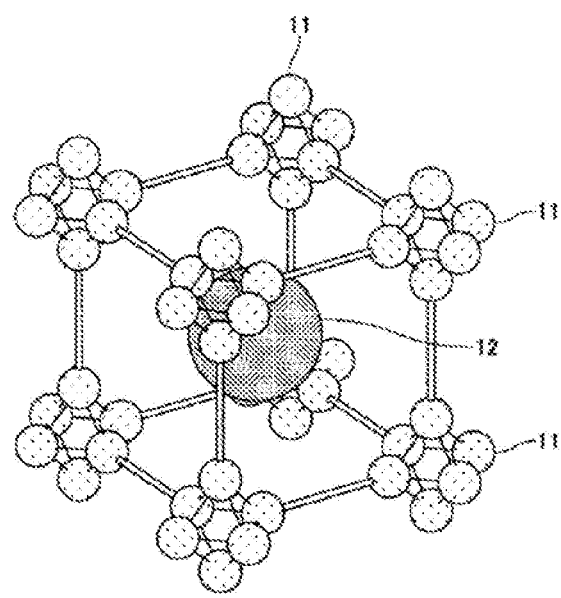
FIG. 1 is a schematic view showing a crystal structure of hexaboride.

A crystal structure of hexaboride (general formula MB$_6$) is shown in FIG. 1.

As shown in FIG. 1, the hexaboride has a cubic system and a simple cubic structure, and an octahedron formed of six boron atoms 11 is arranged at each vertex of the cube. Then, an element M12 is disposed in a central space surrounded by eight octahedrons formed of boron atoms 11.

The calcium lanthanum boride according to the present invention is represented by a general formula Ca$_x$La$_{1-x}$B$_m$ (satisfying 0.001≤x≤0.800, 5.0≤m<6.3), space group Pm(-3) m, and Bravais lattice of a simple cubic structure. Similarly to its terminal compositions, CaB$_6$ (wherein x=1, m=6) and LaB$_6$ (wherein x=0, m=6), Ca or La atom is disposed at the body-center position, and an octahedron of six B atoms is disposed at the corner position.

Conventionally known LaB$_6$ is a metal compound having a large amount of free electrons and when miniaturized to a state of nano-sized fine particles, external electromagnetic waves can be resonantly absorbed due to localized surface plasmon resonance of free electrons. Therefore, a heat shielding effect of LaB$_6$ applies this principle.

On the other hand, the present inventors made intensive studies and found an effect of substituting La position with an alkaline earth element of group-II elements. Then, it is found that calcium lanthanum boride fine particles represented by a general formula Ca$_x$La$_{1-x}$B$_m$ (satisfying 0.001≤x≤0.800, 5.0≤m<6.3) wherein La is partially substituted with Ca, has an effect of revolutionally improving a visible light transmittance according to an addition amount of Ca while maintaining a high infrared absorption effect.

In the calcium lanthanum boride fine particles according to the present invention, it is preferable that a surface is not oxidized, but usually it is often slightly oxidized. Although a detailed composition of the oxidized surface is unknown, a phase in which La and Ca elements are slightly contained in amorphous boric acid B$_2$O$_3$ is considered to have an outermost surface property.

Further, in a dispersion step of calcium lanthanum boride fine particles described later, it is inevitable that oxidation of the particle surface occurs to some extent. However, even in this case, an ability to cause plasmon resonance is maintained with the particle, and therefore the effectiveness of exhibiting a near infrared shielding effect is maintained. Accordingly, for example, even if calcium lanthanum boride fine particles whose surface is oxidized, it can be used as the calcium lanthanum boride fine particles according to the present invention.

Further, in the calcium lanthanum boride fine particles according to the present invention, the higher a crystal perfection, the greater the heat ray shielding effect. However, even if crystallinity is low and X-ray diffraction produces a broad diffraction peak, the heat ray shielding effect is exhibited if a basic bond inside the fine particle is formed by bonding each metal element to a hexaboride frame. Therefore, such calcium lanthanum boride fine particles can be used in the present invention.

Composition, shape, particle size, etc., of the calcium lanthanum boride fine particles according to the present invention will be described hereafter, in an order of (1) Ca content [x: 0.001≤x≤0.800], (2) B (boron) content [5.0≤m<6.3], (3) Shape, (4) Average dispersed particle size, and others.

(1) Ca Content [x: 0.001≤x≤0.800]

In the calcium lanthanum boride [Ca$_x$La$_{1-x}$B$_m$] fine particles according to the present invention, Ca is completely dissolved at La position. However, it is important that Ca content x be in a range of 0.001≤x≤0.800. When the Ca content x is greater than 0.001, the effect of improving the visible light transmittance becomes apparent. On the other hand, when x is 0.800 or less, the effect of improving the visible light transmittance, which is substantially different from CaB$_6$, is a clear characteristic of the present invention. Thus, the effect of the present invention can be obtained.

A more preferable composition for sufficiently maintaining a height of the visible light transmittance which is the effect of the present invention is as follows: the Ca content x is in a range of 0.100≤x≤0.625. This is because in this composition range, an improvement effect of suppressing green coloration is remarkable, and at the same time, sufficient infrared absorption property can be exhibited in a coating layer in which the calcium lanthanum boride fine particles are contained and dispersed.

The calcium lanthanum boride fine particles according to the present invention also has a preferable configuration in which two or more calcium lanthanum boride fine particles having compositions with different values of Ca content x are used in combination. Calcium lanthanum boride fine particles having different values of Ca content x have different absorption wavelengths. Accordingly, there is an effect of substantially broadening an absorption peak wavelength when mixing fine particles having different x values.

The reason is not clear, but experiments show that particularly, fine particles substituted with Ca:La=1:3 (ie, x=0.25) and fine particles substituted with Ca:La=3:1 (ie, x=0.75) are mixed in various proportions, a heat ray shielding layer is formed in which transmittance in the visible range and absorptivity of infrared rays are well-balanced.

The calcium lanthanum boride fine particles according to the present invention may contain some unavoidable impurities in a range of allowing usual industrial implementation. For example, a small amount of an element such as Ce, Pr, Nd, Gd, Tb, Dy, Ho, Y, Sm, Eu, Er, Tm, Yb, Lu, and Sr may be contained, as an impurity to be substituted at La position. Further, a small amount of an element such as C, N or O may be contained, as an impurity to be substituted at B position. Further, the impurities may be contained to such an extent that they are introduced in small amounts in other conventional industrial production processes.

According to the results of preparing the $CaB_6$ fine particle dispersion body and performing optical absorption measurement, it is found that although $CaB_6$ has very low free electron concentration, it has surface plasmon resonance absorption in a mid-infrared region, and has semimetal properties.

Further, in the calcium lanthanum boride, Ca completely dissolves at La position, and change in an absorption wavelength caused by addition of Ca was investigated. Then, in the case of a fine particle group having a particle shape that is approximated to a spherical shape on average, the absorption wavelength gradually extends to a longer wavelength side from about 600 nm for $LaB_6$ fine particles to about 3200 nm for $CaB_6$ fine particles, which is caused by increase of Ca. Then it is found that the change is not uniform, and smaller on La-rich side, suddenly increases on Ca-rich side.

Namely, when the calcium lanthanum boride fine particles are approximated to spherical particles, the plasma absorption wavelength is about 200 nm longer from around 600 nm to around 800 nm in the composition range where the value x of the Ca content is $0.0 \leq x \leq 0.5$. On the other hand, it is found that in the composition range where the value x of the Ca content is $0.5 \leq x \leq 1.0$, the rate of change of the plasma absorption wavelength rapidly increases, and the rate of change is around 2400 nm from around 800 nm wavelength to around 3200 nm wavelength.

Further, in an intermediate composition of the calcium lanthanum boride to which these Ca are added, reduction of a blue side transmittance is improved, which can be attributed to strong green coloration of $LaB_6$ described above. Particularly, it is found that in the composition range where the value x of the Ca content is $0.5 \leq x \leq 0.8$, a green color tone becomes lighter and changes toward a neutral color tone, which is very useful for practical use.

A mechanism of the effect of improving the visible light transmittance by adding Ca to $LaB_6$ will be described hereafter.

In non-patent document 1, the present inventors reveal that the cause of the visible light transmittance and coloration of $LaB_6$ can be understood from its electronic structure.

Namely, in a $MB_6$ material based on group-III elements including $LaB_6$ (wherein M is an element selected from Sc, Y, La and Ac), transmittance should be basically high, due to having a wide gap electronic structure at a point other than a Γ point and X point in the Brillouin zone, and meanwhile the gap is narrow at the Γ point, and a free electron-like band crosses between a lower conduction band and an upper valence band at point X, and such a state can be a cause of low energy electron transitions, ie, deep coloration. However, an upper part of the valence band is mainly boron 2p orbital, and a lower part of the conduction band is a hybrid orbital of La 5d orbital and boron 2p orbital. Therefore, it is found that Fermi's golden rule greatly reduces a transition probability of electrons, causing visible light transmittance.

Based on the above findings, the present inventors further studied the effect of improving the visible light transmittance by addition of other elements to $LaB_6$.

As a result, it is found that in $SrB_6$ and $BaB_6$ based on group-II elements as additive elements, each 3d and 4d electrons form a hybrid orbital with boron 2p electrons to similarly produce visible light transmittance. However, it is found that in the case of Ca, even in the same group-II element, there are no d electrons, but 3p electrons with strong orbital orientation similar to d electrons form the hybrid orbital with boron 2p electrons. Then, the present inventors newly reveal that the hybrid orbital is a p-p type which is slightly different from the d-p type, and it has a different distribution form of electronic transition as compared with the d-p type.

The above new finding led to this invention: in the calcium-lanthanum boride according to the present invention, the improvement in visible light transmittance of $LaB_6$ by addition of Ca is considered to be attributed to the hybridized orbitals of Ca-3d and B-2p around the X point.

A relationship between infrared absorption by plasma absorption and visible light transmittance in the calcium lanthanum boride according to the present invention will be described next.

In general, the intensity of plasma absorption decreases with decrease of a free electron density. However, in the calcium lanthanum boride, an amount of the free electrons decreases with the decrease of La, and therefore an absorption peak tends to be smaller as the value x of the Ca content is larger. On the other hand, the transmittance of visible light increases as the value x of the Ca content increases, and therefore more calcium lanthanum boride fine particles can be introduced into a layer. Namely, an actual calcium lanthanum boride fine particle dispersed layer has an effect of compensating for the decrease of the intensity of plasma absorption by the increase of the amount of the present fine particles. Namely, when the calcium lanthanum boride fine particles are considered as a transparent heat ray shielding material, properties thereof are determined by a balance between intensity of plasma absorption and intensity of the visible light transmittance. Accordingly, even in a case of the calcium lanthanum boride fine particles having high Ca content, the transmittance can be large at visible wavelengths, and a strong heat ray shielding effect can be exhibited.

(2) B (Boron) Content [$5.0 \leq m < 6.3$]

In the calcium lanthanum boride $Ca_xLa_{1-x}B_m$ (satisfying $0.001 \leq x \leq 0.800$) fine particles according to the present invention, elements Ca and La are collectively referred to as M element. Then, it is important that the atomic number ratio m of B (boron) to one atom of M element obtained by chemical analysis of the powder containing the boride fine particles is $5.0 \leq m < 6.3$.

Examples of the fine particles of borides represented by the general formula $MB_m$ include borides represented by $MB_4$, $MB_6$, $MB_{12}$, etc. As the boride fine particles for heat ray shielding, it is important that the value of the atomic ratio m of B is $5.0 \leq m < 6.3$. Here, in the case of $m \geq 5.0$, generation of XB, $XB_2$ and the like is suppressed, and the heat ray shielding property is improved. On the other hand, when satisfying $m < 6.3$, generation of boron oxide particles other than boride fine particles is suppressed. Since the boron oxide fine particles are hygroscopic, if the boron oxide particles are mixed in the boride powder, the moisture resistance of the boride powder will be reduced, and the deterioration of the solar radiation shielding properties will become large over time. Therefore, it is preferable to suppress the generation of boron oxide particles, by setting the value of m to satisfy $m < 6.3$.

Namely, it is important that among the above-described borides, $MB_6$ is mainly contained in the heat radiation shielding boride fine particles, but $MB_4$ and $MB_{12}$ may also be partially contained.

In a case of producing the boride fine particles, when the wet analysis is performed, the value of the atomic number ratio value m of B actually fluctuates slightly from 6 and may contain a slight amount of other phases. According to X-ray diffraction and TEM observation, these phases are $LaBO_3$ and $B_2O_3$, which are considered to be produced as reaction products when the raw material absorbs moisture in the air. In any case, it is important that the main body of the heat ray shielding effect is $MB_6$ fine particles, and the value of m satisfies $5.0 \leq m < 6.3$, including a composition fluctuation of the boride fine particles themselves.

(3) Shape

The heat ray shielding fine particles according to the present invention are the particles containing the calcium lanthanum boride fine particles represented by the general formula $Ca_xLa_{1-x}B_m$ (satisfying $0.001 \leq x \leq 0.800$, $5.0 \leq m < 6.3$), and the shape of each calcium lanthanum boride fine particle is approximately a disk, a flat cylindrical, a flat, a pancake, or a flat spheroidal.

Specifically, the shape of each fine particle of the calcium lanthanum boride fine particles satisfies at least one of the following:

1) when scattering intensity of the calcium lanthanum boride fine particles diluted and dispersed in a solvent is measured using small-angle X-ray scattering, value Ve of a slope of a straight line is $-3.8 \leq Ve \leq -1.5$, which is obtained by double-logarithmic plotting of a relationship between scattering vector $q = 4\pi \sin \theta/\lambda$ and scattering intensity I (q), 2) the particle shape is a flat cylindrical (wherein a diameter of a bottom circle is d and a height of the cylinder is h) shape, or flat spheroidal (wherein a length of a long axis is d and a length of a short axis is h) shape, with a value of aspect ratio d/h being $1.5 \leq d/h \leq 20$.

A preferable shape of the calcium lanthanum boride fine particles will be described more specifically hereafter.

First, for the calcium lanthanum boride fine particles, when the scattering intensity of the fine particles dispersed in a solvent is measured using the small-angle X-ray scattering method, it is important that the value Ve of the slope of the straight line is $-3.8 \leq Ve \leq -1.5$, further preferably $-3.8 \leq V \leq -2.0$, which is obtained by double-logarithmic plotting of the relationship between scattering vector $q = 4\pi \sin \theta/\lambda$ and scattering intensity I (q). Here, the measurement by the small-angle X-ray scattering method described above is performed in the case where the scattered X-rays are observed at a position of an angle $2\theta$ from the incident X-rays incident on the fine particles. There is an optical path difference in the scattered X-rays passing through two points separated by r in the particle, and a phase difference is denoted as r·q using the scattering vector q (defined by a difference between the incident X-ray and the wave number vector of the scattered X-ray).

Further, another preferred shape of the calcium lanthanum boride fine particles is a flat cylindrical (wherein a diameter of a bottom circle is d and a height of a cylinder is h), or is a flat spheroid (however, a length of the long axis is d and a length of the short axis is h). In these shapes, it is important that the aspect ratio d/h is $1 \leq d/h \leq 20$.

The x-ray small-angle scattering used to define the shape of the calcium lanthanum boride fine particles according to the present invention will be described hereafter.

Small-angle X-ray scattering is a method of measuring scattered X-rays having a scattering angle of several degrees or less.

When a wavelength of X-rays is denoted as $\lambda$ and a scattering angle is denoted as $2\theta$, the scattered X-rays having smaller scattering angles is measured from Bragg's law $\lambda = 2d \sin \theta$. Therefore, such a measurement corresponds to a measurement of a large structure in real space.

In addition, measurement of the scattered X-rays having different scattering angles by the small-angle X-ray scattering method, corresponds to observation of a substance with different spatial resolutions. Namely, coarse-grained structural information can be obtained from the scattered X-rays having a small scattering angle, and structural information with higher spatial resolution can be obtained from the scattered X-rays having a large scattering angle.

Specifically, when a scatterer is particulate, the scattering is observed as follows. As the scattering angle $2\theta$ or the scattering vector ($q = 4\pi \sin \theta/\lambda$) decreases, scattering corresponding to structural information observed at a larger scale is observed in such a manner as the structure of atoms and molecules in particles, the structure of particle surfaces (smoothness and density profile), the shape of particles, and the size of particles.

On the other hand, since scattering intensity I (q) is obtained by the Fourier transform of the autocorrelation function of the electron density distribution, the scattering function of the scatterer having an arbitrary shape can be specifically calculated. The square of a scattering amplitude of this scattering function is the scattering intensity.

Here, when the scattering intensity is calculated in a case of the scatterer having an extreme shape, for example, such as a sphere, an infinitely thin and long rod, an infinitely thin disk, an exponential law is established for the scattering intensity I (q) and the scattering vector q. Accordingly, rough shape information of the scatterer can be obtained by taking a double-logarithmic plot of the scattering intensity I (q) and the scattering vector q to obtain the slope of the plot. Specifically, in the case of the above-described extreme shape, the slope of the plot is known as follows. In the case of a sphere: the slope is $-4$, in the case of an infinitely thin and long rod: the slope is $-1$, and in the case of an infinitely thin disk: the slope is $-2$.

As described above, the particle shape of the calcium lanthanum boride fine particles according to the present invention is considered as follows. The particle shape of the calcium lanthanum boride fine particles can be evaluated by measuring the scattering intensity of the fine particles diluted and dispersed in IPA using the small-angle X-ray scattering method described above, then double-logarithmic plotting the relationship between the scattering intensity I (q) and the scattering vector q, and calculating the slope of the plot.

On the other hand, as well known, due to a localized surface plasmon resonance effect, a resonance wavelength is changed according to the particle shape. In general, when the particle shape is spherical, an absorption wavelength is obtained at a shortest wavelength. On the other hand, when the particle shape is disc-like, the absorption wavelength shifts to a long wavelength side, and simultaneously the absorption wavelength splits into a short wavelength peak corresponding to resonance on the short axis and a long wavelength peak corresponding to resonance on the long axis.

Further, in the case of the disc-like fine particles, the short wavelength peak corresponding to the resonance on the short axis is relatively smaller than the long wavelength peak corresponding to the resonance on the long axis. When this effect is summed up for a group of fine particles existing by a number comparable to the Avogadro number, the short wavelength peak disappears and the long wavelength peak becomes one large broad peak. Accordingly, from a near infrared absorption performance, the disc-like fine particles are preferable because the plasmon resonance wavelength is shifted to the long wavelength side and large near infrared absorption can be obtained as compared with the case of the spherical fine particles.

On the other hand, in the case of the rod-like (thin and long rod-like) fine particles, since the short wavelength peak corresponding to the resonance on the short axis becomes relatively strong, the shape of the rod-like fine particles splits into the short wavelength peak and the long wavelength peak corresponding to the resonance on the long axis. If this effect is observed for a huge number of fine particles comparable to the Avogadro's number, such a split state remains, and such a state is not particularly desired for the heat ray shielding layer according to the present invention because an object of the present invention is to overcome current problems by clearly separating and controlling the optical response into visible light transmission property and near infrared absorption property.

As described above, from the relationship between the calcium lanthanum boride fine particles and the resonance wavelength of their localized surface plasmon resonance, the present inventors achieve a preferable form of the calcium lanthanum boride fine particles according to the present invention. Specifically, the present inventors found that it is important that the value Ve of the slope of the straight line is $-3.8 \leq Ve \leq -1.5$, further preferably $-3.8 \leq V \leq -2.0$, which is obtained by double-logarithmic plotting of the relationship between scattering vector $q=4\pi \sin \theta/\lambda$ and scattering intensity I (q).

When the slope Ve described above becomes less than $-3.8$, the particle shape of the calcium lanthanum boride fine particles becomes almost spherical, and a collective effect of shape anisotropy decreases. Therefore, the bandwidth of the plasmon absorption narrows and the near infrared absorption effect is reduced.

On the other hand, when the slope Ve becomes larger than $-1.5$, the particle shape of the calcium lanthanum boride fine particles approaches a rod shape (needle shape, bar shape). Therefore, the resonance in the long axis direction becomes weak and the resonance in the short axis direction becomes strong. Then, the splitting of the resonant wavelength becomes more remarkable and the near infrared absorption effect is reduced. Also this is because, since the resonance wavelength in the short axis direction is in a visible light region, and visible transmission decreases thereby causing coloration (layer coloration).

Further, another preferable shape of the calcium lanthanum boride fine particles is a flat cylindrical (wherein the diameter of the bottom circle is d and the height of the cylinder is h), or a flat spheroid (wherein, the length of the long axis is d and the length of the short axis is h). In the flat cylinder or the flat spheroid, it is important that the aspect ratio d/h is $1 \leq d/h \leq 20$.

The present inventors found that in non-patent document 2, when $LaB_6$ nano-sized fine particles are a group including disc-like particles having various d/h values (wherein the long axis length is d and the short axis length is h), the plasmon absorption bandwidth actually spreads seven times or more compared to the plasmon absorption bandwidth of a group of uniformly spherical $LaB_6$ nano-sized fine particles.

As a result thereof, in the case of the disc-like calcium lanthanum boride fine particles having a composition of Ca content x according to the present invention, the peak of the absorption wavelength is shifted several hundred nm longer than that of spherical particles in accordance with the ratio d/h of the disc shape (long axis length is d and short axis length is h). Accordingly, it is important to make corrections for the disc-like calcium lanthanum boride fine particles, in consideration of a shape factor of shaping into the above-described optimum elemental composition.

Specifically, it is preferable that the calcium lanthanum boride fine particles according to the present invention are disc-like particles, and the aspect ratio d/h is preferably $1 \leq d/h \leq 20$ in the flat cylinder (wherein the diameter of the bottom circle is d and the height of the cylinder is h), or in the flat spheroid (wherein the length of the long axis is d and the length of the short axis is h).

With the particle shape in the above range, the calcium lanthanum boride fine particles according to the present invention have sufficient properties as a heat ray shielding material which widely shields a heat ray component contained in the sunlight, and can improve the visible light transmittance rather than the conventionally known heat ray shielding material.

In contrast, when the aspect ratio d/h is less than 1, the particle shape of the calcium lanthanum boride fine particles becomes a thin cylinder shape (close to rod-like, bar-like), which is not preferable for the same reason as the above case of Ve>$-1.5$.

On the other hand, when the aspect ratio d/h exceeds 20, although large absorption can be obtained in the near infrared region, the particle size becomes very large due to large d, and a presence of haze and decrease of visible light transmittance become problems. This is because even if d is fixed and h is set to be smaller reversely, a particle thickness is limited, because a thickness as thin as 0.1 nm cannot be realized.

(4) Average Dispersed Particle Size

An average dispersed particle size of the calcium lanthanum boride fine particles according to the present invention is preferably 800 nm or less. This is because when the average dispersed particle size is 800 nm or less, it is possible to secure the visibility of the visible light region and secure the transparency at the same time without completely shielding the light due to scattering, in the case where the calcium lanthanum boride fine particles are contained in a calcium lanthanum boride fine particle dispersion body described later. In the present invention, the average dispersed particle size of the calcium lanthanum boride fine particles refers to a value obtained by measuring the average dispersed particle size of the calcium lanthanum boride fine particles in the dispersion liquid by a dynamic light scattering method (FFT-power spectrum method). In the present specification, the average dispersed particle size may be simply referred to as an "average particle size".

In the calcium-lanthanum boride fine particles according to the present invention, particularly, when the transparency of the visible light region is focused, it is preferable to also consider the reduction of scattering due to the calcium lanthanum boride fine particles.

If the reduction of scattering due to the calcium lanthanum boride fine particles is taken into consideration, the average dispersed particle size is preferably 100 nm or less. The reason is as follows. In the calcium lanthanum boride fine particle dispersion liquid and a calcium lanthanum boride particle dispersion body described later, if the average dispersed particle size of the fine particles is small, scattering of light in the visible light region in the wavelength range from 400 nm to 780 nm due to geometric scattering or Mie scattering is reduced. As a result of the scattering of the light being reduced, it is possible to prevent the fine particle dispersion body from becoming like frosted glass and losing clear transparency.

This is because when the average dispersed particle size of the calcium lanthanum boride fine particles is 100 nm or less, the above-described geometrical scattering or Mie scattering is reduced, and a region where the Rayleigh scattering is strong can be provided. In the Rayleigh scattering region, the scattered light is proportional to the sixth power of the particle size, and therefore as the average dispersed particle size of the fine particles decreases, the scattering decreases and the transparency improves. Further, when the average dispersed particle size of the calcium lanthanum boride fine particles is 50 nm or less, the scattered light is extremely reduced, which is particularly preferable. From a viewpoint of avoiding light scattering, it is preferable that the average dispersed particle size of the calcium lanthanum boride fine particles be smaller, and industrial production is not difficult if the average dispersed particle size is 1 nm or more.

The calcium lanthanum boride fine particles basically have very stable properties against UV light and sunlight as a characteristic of inorganic materials. Namely, there is almost no change in the material properties upon irradiation with UV light or sunlight, and almost no deterioration of color or functions occurs. Further, a crystal structure in which La and Ca ions are surrounded by a basic frame of strongly and covalently bonded $B_6$ octahedron is very stable, and even nano-sized fine particles have sufficient practical resistance to moisture, UV and moisture co-attack. Accordingly, basically, it can be said the calcium lanthanum boride fine particles have extremely stable weather resistance (oxidation resistance, water resistance, moisture resistance, UV resistance).

Further, if the surface of calcium lanthanum boride fine particles is coated with an oxide or nitride containing one or more elements of Si, Ti, Zr, or Al, using a suitable alkoxide, etc., it is possible to further improve the weather resistance and chemical resistance of the fine particles.

[b] Method for Producing Calcium Lanthanum Boride Fine Particles

There are various methods for producing the calcium-lanthanum boride fine particles according to the present invention.

The method for producing the calcium lanthanum boride fine particles according to the present invention will be described in detail hereafter in an order of (1) Solid phase reaction method, (2) CVD method, (3) Direct reaction method between elements, (4) Thermal plasma method, (5) Molten salt electrolysis method, Other methods.

(1) Solid Phase Reaction Method

For example, the solid phase reaction method by $B_4C$ reduction described in non-patent document 3 and non-patent document 4 can be used by modification. According to this method, oxide sources $La_2O_3$ and CaO are mixed with $B_4C$ and reacted at high temperature in vacuum or in an inert gas. Then, $Ca_xLa_{1-x}B_6$ can be obtained by a reducing action of $B_4C$. However, since a firing temperature is as high as 1500° C. to 2200° C. in the reaction, the obtained $Ca_xLa_{1-x}B_6$ particles are coarsened. On the other hand, as described above, in order to use the calcium lanthanum boride fine particles in heat shielding applications, a particle size is required to be sufficiently smaller than a visible light wavelength. Therefore, it is important that the coarsened calcium lanthanum boride fine particles be finely strongly pulverized into nano-sized fine particles by a mechanical method using a jet mill, a ball mill, an attritor, a bead mill or the like.

It is also found that in the production of $Ca_xLa_{1-x}B_6$, homogenization is relatively difficult, and for example in the production of $Ca_xLa_{1-x}B_6$, $C_aB_6$ and $LaB_6$ may be separated locally, as compared to a case of simply producing $CaB_6$ or $LaB_6$, and it is quite difficult for Ca and La with different valences to uniformly occupy a body-centered position of a simple cubic lattice formed by eight $B_6$ octahedra. Accordingly, in a case of using the solid phase reaction method, it is preferable to keep the temperature as high as possible for a long time.

Therefore, use of sodium borohydride $NaBH_4$ as the B raw material is also a preferable configuration as one method in the case of using the solid phase reaction method.

Namely, $NaBH_4$ not only provides a boron source, but also is decomposed into $NaBH_4$ (s)→NaH (s)+$BH_3$ (s) at 460° C., and $BH_3$ (s)→B (s)+3/2$H_2$ (g) at 506° C. to form a gas phase.

As a result, it is found that elemental diffusion is significantly promoted and B diffusion is also promoted, and $Ca_xLa_{1-x}B_6$ can be formed by Ca and La so as to uniformly occupy the body-centered position of a simple cubic lattice formed by eight $B_6$ octahedrons. With the above configuration, it is also possible to set the firing temperature to 1300° C. or less.

Further, in order to promote reduction in the solid phase reaction method, it is also preferable to add metal powder such as Mg. In the above configuration, a great heat of reaction produced by the reduction reaction also has the effect of promoting the reaction of producing $Ca_xLa_{1-x}B_6$.

(2) CVD Method

The calcium-lanthanum boride fine particles according to the present invention can also be obtained by a CVD (Chemical Vapor Deposition) method. This method is a method in which hydrogen reduction of metal halides gives borides.

As a compound containing La or Ca, for example, $LaCl_3$ (lanthanum chloride) or $CaCl_2$ (calcium chloride) can be suitably used. As a compound containing boron, for example, $BCl_3$ (boron trichloride) can be suitably used.

The above raw materials and hydrogen gas and nitrogen gas are introduced into a reaction furnace and heated to a high temperature, and then boron trichloride gas is introduced and reacted.

$LaB_6$ single crystal or $CaB_6$ single crystal may be used as a reaction substrate. A deposited $Ca_xLa_{1-x}B_6$ reactant is stripped from the substrate and washed to obtain calcium lanthanum boride fine particles. It is important that the obtained calcium lanthanum boride fine particles be finely strongly pulverized into nano-sized fine particles by a mechanical method using a jet mill, a ball mill, an attritor, a bead mill or the like.

Further, it is also possible to obtain nano-sized calcium lanthanum boride fine particles directly by adjusting CVD reaction conditions.

(3) Direct Reaction Method Between Elements

The calcium lanthanum boride fine particles according to the present invention can also be obtained by a direct reaction between elements. Namely, when calcium metal and lanthanum metal are reacted with boron at a high temperature of 1700° C. or more, boride of high purity can be obtained. However, the raw materials are very expensive, and therefore the above process is generally not industrial.

(4) Thermal Plasma Method

The calcium lanthanum boride fine particles according to the present invention can also be produced by a thermal plasma method. According to this method, it is possible to directly produce nano-sized fine particles by reacting raw materials in a thermal plasma reactor. In the case of the thermal plasma method, it is characteristic that little lattice defects are introduced into particles, because the mechanical pulverization step required in the final step of the above-described method can be omitted. When the number of lattice defects is small, a relaxation time of free electrons is increased, and therefore there is an effect of making a near infrared absorption wavelength shifted to a short wavelength side.

For example, the following plasma can be applied to the above-described thermal plasma method: i.e. any one of DC arc plasma, high frequency plasma, microwave plasma, low frequency alternating current plasma, or a superposition of these plasmas, or plasma generated by an electrical method in which a magnetic field is applied to a direct current plasma, plasma generated by irradiation of high power laser, and plasma generated by high power electron beam or ion beam. Whichever thermal plasma method is used, a thermal plasma having a high temperature portion of 10000 to 15000 K is preferable, and particularly, a plasma capable of controlling a generation time of ultrafine particles is preferable.

The raw material supplied into the thermal plasma having the high temperature part evaporates instantaneously in the high temperature part. Then, the vaporized raw material is condensed in a process leading to a plasma tail flame and is rapidly solidified outside the plasma flame to produce calcium lanthanum boride fine particles. A synthesis method will be described with reference to FIG. 2 by taking a case of using a high frequency thermal plasma reaction apparatus as an example.

Figure 2:
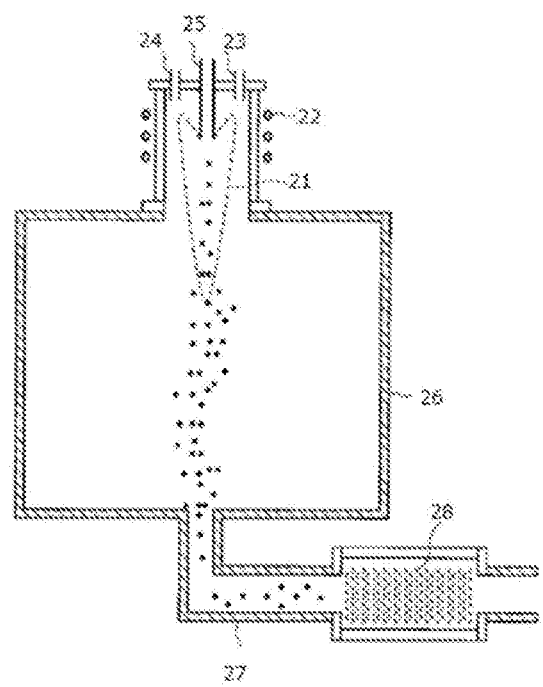
FIG. 2 is a schematic view of one embodiment of a high frequency thermal plasma reactor used in the present invention.

In the high frequency thermal plasma reactor shown in FIG. 2, first, inside of a reaction system constituted by a water-cooled quartz double pipe and a reaction vessel 26 is evacuated by an evacuation device, and thereafter the reaction system is filled with argon gas. Thereafter, any one of the gases selected from argon gas, mixed gas of argon and helium (Ar—He mixed gas), or mixed gas of argon and nitrogen (Ar—$N_2$ mixed gas) is introduced as plasma gas into the reaction vessel. On the other hand, an Ar—He mixed gas is introduced as sheath gas flowing immediately outside a plasma region. Then, an alternating current is applied to a high frequency coil 22 to generate thermal plasma by a high frequency electromagnetic field (for example, a frequency of 4 MHz).

Here, reaction is carried out for a predetermined time by introducing mixed powder as the raw material from a raw material powder supply nozzle 25 into thermal plasma, using argon gas supplied from a gas supply device (not shown) as carrier gas. After the reaction, the produced calcium lanthanum boride fine particles are deposited on a filter 28, and are collected.

The plasma gas has a function of maintaining a thermal plasma region having a high temperature portion of 10000 to 15000 K, and sheath gas has a function of cooling an inner wall surface of a quartz torch in the reaction vessel, and preventing the quartz torch from melting. Further, the plasma gas and the sheath gas affect a shape of the plasma region, so a shape control of the plasma region can be performed by adjusting a flow rate of these gases. Further, it is important to control the generation time of the generated fine particles by adjusting a flow rate of the carrier gas and a supply rate of the raw material.

(5) Molten Salt Electrolysis Method, Other Methods

Calcium lanthanum boride fine particles can be synthesized also by molten salt electrolysis, combustion synthesis, solvothermal method, autoclave method, wet method or the like.

The method for producing calcium lanthanum boride fine particles is not limited to the above examples, and any method capable of producing calcium lanthanum boride fine particles according to the present invention may be used.

The particle shape and size of the calcium-lanthanum-borate fine particles produced by the production method described in the above (1) to (5) can be controlled in various producing steps of the fine particles.

In the case of employing the step of pulverizing into nano-sized fine particles, the particle shape and the size are controlled according to a pulverizing method. Calcium lanthanum boride is very hard because of a strong covalent bonding of B, and a special method is required for pulverization. For example, when using a media stirring mill, it is known that a pulverization mode is different depending on a bead type and a bead size, and a gradual conversion of the pulverization mode is known to occur as pulverization proceeds from the early to the late stage.

Because the surface of calcium lanthanum boride is very hard, a solid follows the mode of volumetric pulverization in the early stage of pulverization, where it is broken coarsely. This volumetric pulverization is repeated to gradually decrease the size of particles. In the late stage of pulverization, the overall breakage takes place much less frequently but the mode changes to surface pulverization where the particle surface is scraped off to produce numerous thin and fine particle. Therefore, the shape and the size of the pulverized fine particles are controlled by adjusting the pulverization conditions. By primarily following the mode of surface pulverization, we may obtain the calcium lanthanum boride fine particles of the present invention which is approximately a disk, a flat cylindrical, a flat, a pancake, or a flat spheroidal.

Further, in the case of producing fine particles by build-up process, control of a particle shape is possible by appropriately combining parameters that control the respective reaction conditions.

For example, in the wet method, calcium lanthanum boride fine particles are produced by heating lanthanum chloride and calcium chloride and sodium borohydride at 300 to 500° C. in a neutral atmosphere. Addition of a small amount of isophthalic acid changes the size and shape of the calcium lanthanum boride fine particles.

Also in the autoclave method, in addition to the reaction temperature and pressure, a small amount addition of an additive acting as a modifier is a point of controlling the size and the shape of the particles.

[c] Heat Ray Shielding Fine Particle Dispersion Liquid and Method for Producing the Same By dispersing the heat ray shielding fine particles in a liquid medium, the heat ray shielding fine particles containing the calcium lanthanum boride fine particles obtained by the above-described production method, a heat ray shielding fine particle dispersion liquid according to the present invention can be obtained.

A method of producing the heat ray shielding particle dispersion liquid containing calcium lanthanum boride fine particles will be described hereafter. In the present invention, the heat ray shielding fine particle dispersion liquid may be simply referred to as a "dispersion liquid".

By adding the heat ray shielding fine particles containing calcium lanthanum boride fine particles according to the present invention, and adding optionally an appropriate amount of dispersing agent, coupling agent, surfactant, etc., into a liquid medium and dispersing the mixture, the heat ray shielding fine particle dispersion liquid according to the present invention can be obtained. The medium for the dispersion liquid is required to have a function to maintain dispersibility of the heat ray shielding particles according to the present invention, and a function to prevent defects when forming a layer using the heat ray shielding fine particle dispersion liquid.

(1) Medium

The liquid medium is preferably at least one selected from water, organic solvents, fats and oils, liquid resins, and liquid plasticizers for plastics.

As an organic solvent that satisfies the above requirements, it is possible to select various ones such as alcohol type, ketone type, hydrocarbon type, glycol type and water type. Specifically, alcohol solvents such as methanol, ethanol, 1-propanol, isopropanol, butanol, pentanol, benzyl alcohol, diacetone alcohol; ketone solvents such as acetone, methyl ethyl ketone, methyl propyl ketone, methyl isobutyl ketone, cyclohexanone and isophorone; ester solvents such as 3-methyl-methoxy-propionate; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate; amides such as formamide, N-methylformamide, dimethylformamide, dimethylacetamide, N-methyl-2-pyrrolidone and the like; aromatic hydrocarbons such as toluene and xylene; halogenated hydrocarbons such as ethylene chloride and chlorobenzene, and the like can be used. Among them, organic solvents with low polarity are preferable, and particularly isopropyl alcohol, ethanol, 1-methoxy-2-propanol, dimethyl ketone, methyl ethyl ketone, methyl isobutyl ketone, toluene, propylene glycol monomethyl ether acetate, n-butyl acetate and the like are more preferable. These solvents may be used alone or in combination of two or more.

As liquid resin, methyl methacrylate etc., is preferable. As a liquid plasticizer for plastic, preferable examples include plasticizers that are compounds of monohydric alcohols and organic acid esters, ester-based plasticizers such as polyhydric alcohol organic acid ester compounds, and phosphoric acid-based plasticizers such as organic phosphoric acid-based plasticizers. Among them, triethylene glycol di-2-ethyl hexanate, triethylene glycol di-2-ethyl butyrate, and tetraethylene glycol di-2-ethyl hexanate are more preferable because of low hydrolyzability.

(2) Dispersant, Coupling Agent, Surfactant

As described above, when the heat ray shielding fine particles are added to the liquid medium and dispersed to obtain the heat ray shielding fine particle dispersion liquid according to the present invention, appropriate amounts of dispersant, coupling agent and surfactant can be selected and added if desired according to applications. In the dispersant, coupling agent, and surfactant to be added, it is preferable to have an amine-containing group, a hydroxyl group, a carboxyl group or an epoxy group as a functional group. These functional groups are adsorbed on the surface of the heat ray shielding fine particles to prevent the aggregation of the heat ray shielding fine particles, and have an effect of uniformly dispersing the heat ray shielding fine particles even in a heat ray shielding layer or a coating liquid for a heat ray shielding layer, etc.

As a dispersant which can be suitably used, phosphate compounds, polymer dispersants, silane coupling agents, titanate coupling agents, aluminum coupling agents, etc., can be used. However, the dispersant is not limited thereto. As a polymeric dispersant, acrylic polymer dispersants, urethane polymer dispersants, acrylic block copolymer polymer dispersants, polyether dispersants, polyester polymer dispersants, etc., can be used.

An addition amount of the dispersant is preferably in a range of 10 parts by mass to 1000 parts by mass and more preferably in the range of 20 parts by mass or more and 200 parts by mass or less, with respect to 100 parts by mass of the heat ray shielding fine particles. When the addition amount of the dispersant is in the above range, the heat ray shielding fine particles do not aggregate in the liquid, and dispersion stability is maintained.

Further, it is also possible to add various surfactants, coupling agents and the like. An addition amount at that time is desirably 30 parts by mass or less, preferably 5 parts by mass or less, with respect to 100 parts by mass of the heat ray shielding fine particles.

As a method of dispersion treatment, any method can be selected from known methods as long as the heat ray shielding fine particles are uniformly dispersed in the liquid medium, and for example, a method of dispersing using a bead mill, a ball mill, a sand mill, ultrasonic dispersion or the like can be used.

In order to obtain a uniformly dispersed heat ray shielding particle dispersion liquid, various additives and dispersants other than the above may be added or pH may be adjusted according to applications.

(3) Heat Ray Shielding Particle Dispersion Liquid

It is preferable that content of the heat ray shielding fine particles in the heat ray shielding fine particle dispersion liquid obtained by the production method described above is 0.02 mass % or more and 20 mass % or less. If the content of the heat ray shielding fine particles is 0.02 mass % or more, such heat ray shielding fine particles can be suitably used for the production of a coating layer, a plastic molded body, etc., which are excellent in heat ray shielding performance, and if the content of the heat ray shielding fine particles is 20 mass % or less, industrial production is easy. More preferably, the content is 0.5 mass % or more and 20 mass % or less.

The heat ray shielding fine particle dispersion liquid according to the present invention is prepared, in which the heat ray shielding fine particles containing calcium lanthanum hexaboride fine particles as described above are dispersed in a liquid medium, and it is put in a suitable transparent container and measured using a spectrophotometer, with a light transmittance as a function of a wavelength.

The heat ray shielding fine particle dispersion liquid according to the present invention has a main absorption peak in a range of wavelengths approximately from 850 nm to 5000 nm. However, the spectrophotometer enables a measurement of up to about 2600 nm wavelength depending on a model, and further, the transmittance at wavelengths beyond 2600 nm can be measured using a Fourier transform infrared spectrometer (FTIR) or the like.

In the measurement, the transmittance of the heat ray shielding particle dispersion liquid can be easily adjusted by diluting the liquid with a dispersion solvent or a suitable solvent having compatibility with the dispersion solvent.

[d] Coating Liquid for a Heat Ray Shielding Layer and Heat Ray Shielding Layer, Heat Ray Shielding Resin Film and Method for Producing them By further adding a binder containing at least one of resins selected from UV curable resin, room temperature curable resin, thermoplastic resin, or partial hydrolysis polymer of alkoxide into the heat ray shielding fine particle dispersion liquid according to the present invention described above, a coating liquid for a heat ray shielding layer according to the present invention can be produced. In the coating liquid for a heat ray shielding layer, it is preferable to contain the above heat ray shielding fine particles in an amount of 0.8 mass % or more and 10.0 mass % or less. By containing the heat ray shielding particles in the amount of 0.8 mass % or more and 10.0 mass % or less, the heat ray shielding layer can be easily formed, and a sufficient heat ray shielding effect of the obtained heat ray shielding layer is achieved.

In the case of using an UV curable resin as a binder of the coating liquid for a heat ray shielding layer according to the present invention, photopolymerizable oligomers such as epoxy acrylate, urethane acrylate, polyester acrylate, polyether acrylate, etc., and a substance mainly composed of the mixture of photopolymerizable monomers such as monofunctional acrylates and polyfunctional acrylates, and further, added with photoinitiators such as benzoin, acetophenone, thioxanthone, peroxide, etc., and photoinitiators such as amine and quinone etc., can be used. Further, a thermal polymerization inhibitor, an adhesion promoter, a thixotropic agent, a plasticizer, a specific reactive polymer, or a colorant may be added.

Further, by adding fine particles such as $SiO_2$, $TiO_2$, $ZrO_2$, $Al_2O_3$ and $MgO$ to the UV curable resin as a binder, layer strength can be further improved.

Further, by chemically bonding an inorganic substance such as $SiO_2$, $TiO_2$, $ZrO_2$, $Al_2O_3$ or $MgO$ to the main component of the UV curable resin as a binder, the effect of improving the layer strength can be obtained.

By using the coating liquid for a heat ray shielding layer using the UV curable resin excellent in the characteristics such as abrasion resistance obtained by the above-described method, it is possible to simultaneously impart a solar radiation shielding property and a hard coat function to a resin film or a resin base material.

Further, in a case of the coating liquid for a heat ray shielding layer using a room temperature curable resin as a binder, it can be coated on the windows of existing houses, buildings, vehicles, etc. and cured as it is.

Further, in a case of using a thermoplastic resin as a binder, there is no particular limitation as long as it is a transparent thermoplastic resin having a high light transmittance in the visible light region, and for example, it is possible to use the thermoplastic resin having a visible light transmittance of 50% or more described in JIS R 3106 and a haze of 30% or less described in JIS K 7105 when a plate-like molded product having a thickness of 3 mm is used. Specifically, polycarbonate resin, poly (meth) acrylic acid ester resin, saturated polyester resin, cyclic olefin resin, polyimide resin, polystyrene resin, polyether sulfone resin, fluorine resin etc., can be used.

Further, in a case of using a partial hydrolysis polymer of alkoxide as a binder, partial hydrolysis polymers of alkoxides of silicon, titanium, zirconium, aluminum or alkoxides of aluminum can be used.

By applying the coating liquid for a heat ray shielding layer using a thermoplastic resin and/or a partially hydrolyzed polymer of alkoxide as a binder on one side or both sides of a substrate, as described above, the heat ray shielding layer can be formed.

The conductivity of the heat ray shielding layer obtained using the coating liquid for a heat ray shielding layer described above is exhibited along a conductive path passing through a contact point of the heat ray shielding fine particles. Therefore, for example, the conductive path can be partially cut by adjusting an amount of the surfactant or the coupling agent to be added, and conductivity of the heat ray shielding layer can be easily reduced to a surface resistance value of $10^6 \Omega/\square$ (read as ohms per square) or more. Also by adjusting a content of an alkoxide of each metal of silicon, zirconium, titanium, aluminum, or a partially hydrolyzed polymer thereof, or a synthetic resin binder in the heat ray shielding layer, control of conductivity is possible.

Further, in the heat ray shielding layer according to the present invention, a calcium lanthanum boride inorganic material is used as a heat ray shielding material. Therefore, the weather resistance of the layer is better than when using an organic material as the heat ray shielding material, and there is almost no deterioration of color and functions even when used in a sunbeam.

The coating method of the coating liquid for a heat ray shielding layer is not particularly limited, and any method can be adopted appropriately, such as spin coating method, spray coating method, dip coating method, screen printing method, roll coating method, flow coating method, screen printing method, blade coating method, etc. as long as a treatment liquid can be applied flat and thin uniformly.

When producing the heat ray shielding layer using the coating liquid for a heat ray shielding layer according to the present invention which is added with a resin binder, the coating layer may be cured according to each curing method.

In a case of the UV curable resin, an UV lamp may be selected in accordance with a resonance wavelength of each photoinitiator and a target curing speed. Typical lamps are: a low pressure mercury lamp, a high pressure mercury lamp, a super high pressure mercury lamp, a metal halide lamp, a pulse xenon lamp, an electrodeless discharge lamp, etc.

In a case of the electron beam curing type resin binder which does not use the photoinitiator, the coating layer may be cured using an electron beam irradiation apparatus such as a scanning type or an electron curtain type.

In a case of a thermosetting resin binder, heating may be performed at a target temperature, and in a case of a room temperature curable resin, it may be left as it is after application.

In the heat ray shielding resin film obtained by forming the heat ray shielding layer on the substrate using the resin film as the substrate, the resin film suitable for application should just be selected suitably as the resin film used as the base material. As the resin film base material, generally, a light-transparent and less-scattering, colorless and transparent resin is suitable, and for example, the resin film selected from polycarbonate resin, poly (meth) acrylate resin, saturated polyester resin, cyclic olefin resin, or any one or more resins can be used.

As these resin films, hard materials which are hard to be scratched on the surface are preferably used. Further, the resin film that is easily softened by heating of a dryer may be used so that it is easy to stick to a back window of a car.

Further, the surface of the resin film base material may be subjected to surface treatment for the purpose of improving a binding property with a resin binder, such as corona treatment, plasma treatment, flame treatment, primer layer coating treatment, and the like.

Further, in a case of focusing a design of the resin film, it is also possible to use a pre-colored base material or a molded base material. In addition, color pigments or dyes may be added to the coating liquid.

Further, in the heat ray shielding resin film described above, by providing an adhesive layer for adhesion on one side of the film, the heat ray shielding resin film can be attached to glass or the like. Handling is facilitated by laminating the adhesive layer for adhesion and a release film layer on an adhesive surface of the heat ray shielding resin film, which is preferable.

Further, it is also a preferable configuration to disperse the heat ray shielding fine particles according to the present invention described above in the adhesive layer for adhesion described above. In order to produce the adhesive layer for adhesion, the heat ray shielding fine particle dispersion liquid according to the present invention may be added to and mixed with a binder for forming the adhesive layer for adhesion.

The adhesive agent used for the adhesive layer described above can be variously selected according to applications. As a general adhesive agent, a rubber-based adhesive agent, an acrylic-based adhesive agent, a silicone-based adhesive agent, an epoxy-based adhesive agent, a vinyl-based adhesive agent, a urethane-based adhesive agent and the like can be used. Further, in view of transparency, adhesion to glass and the like and weather resistance, an acrylic copolymer-based pressure-sensitive adhesive agent is preferable. As an acrylic copolymer, for example, copolymers with methacrylic acid esters, acrylic acid esters, and other monomers optionally compounded can be used.

Further, as the above-described methacrylic acid ester, for example, methacrylic acid alkyl ester such as methyl methacrylate, ethyl methacrylate, 2-hydroxyethyl methacrylate, propyl methacrylate, 2-hydroxypropyl methacrylate, butyl methacrylate, t-Butyl methacrylate, pentyl methacrylate, hexyl methacrylate, 2-ethylhexyl methacrylate, octyl methacrylate, nonyl methacrylate, decyl methacrylate, dodecyl methacrylate, esters of methacrylic acid with a cycloaliphatic alcohol, such as cyclohexyl methacrylate, and methacrylic acid aryl esters such as phenyl methacrylate and benzyl methacrylate, etc., can be used.

Further, as the above-described acrylic ester, acrylic acid alkyl ester such as methyl acrylate, ethyl acrylate, methoxyethyl acrylate, dimethylaminoethyl acrylate, 2-hydroxyethyl acrylate, propyl acrylate, 2-hydroxypropyl acrylate, butyl acrylate, isobutyl acrylate, pentyl acrylate, hexyl acrylate, 2-ethylhexyl acrylate, N-octyl acrylate, isooctyl acrylate, nonyl acrylate, isononyl acrylate, decyl acrylate, dodecyl acrylate, esters of acrylic acid with alicyclic alcohols, such as cyclohexyl acrylate, and acrylic acid aryl esters such as phenyl acrylate and benzyl acrylate, etc., can be used.

The adhesive agent used in the present invention is a copolymer obtained by reacting monomers as described above. Then, other monomers may be copolymerized to such an extent that the adhesive properties of the copolymer are not impaired. As the copolymerizable monomer, for example, vinyl acetate, styrene, vinyl toluene, acrylonitrile and acrylamide can be used.

Further, the adhesive agent used in the present invention preferably contains a crosslinking agent. For example, as the crosslinking agent, an epoxy resin, a melamine resin, a urea resin, a polyamine compound, a polyisocyanate compound, a metal chelate etc., can be used. Further, according to the purpose, and within a range that does not impair the performance of the adhesive agent, a tackifier, a weathering stabilizer, a plasticizer, an antioxidant, an antifoamer, a wettability regulator, a leveling agent, a filler, etc., can be used.

Further, an UV absorber can also be added to the adhesive agent used in the present invention. As an inorganic UV absorbing component among the UV absorbers, fine particles of cerium oxide ($CeO_2$), titanium oxide ($TiO_2$), zinc oxide (ZnO), zirconium oxide ($ZrO_2$), etc., can be used as typical examples thereof. These oxide fine particles have an absorption edge of light in the UV to a visible region and absorb UV light. Further, since it is an inorganic substance, it is less deteriorated by light and moisture, and has stability over time. However, from a viewpoint of suppressing the increase in viscosity of the coating liquid and securing a leveling property of the liquid, the addition is preferably 20 mass % or less, more preferably 7 mass % or less.

On the other hand, as the organic UV absorbing component in the UV absorber used in the present invention, benzophenones and benzotriazoles, which have a large absorption effect can be preferably used. Further, other commercially available materials such as triazines, oxalic anilides, cyanoacrylates, salicylates, etc., can also be used. These organic UV absorbing components have much better absorption efficiency than inorganic UV absorbing components. However, exudation and precipitation are likely to occur due to an influence of heat or moisture in the air. Therefore, from a viewpoint of avoiding these matters, the addition amount of about 5 mass % or less is preferable. Further, these organic UV absorbing components are deteriorated by UV light and oxygen in the air. Therefore, at the same time, it is also preferable to appropriately add a light stabilizer (HALS), a peroxide decomposer, a quencher, etc.

Also in the heat ray shielding resin film provided with the adhesive layer for adhesion containing the heat ray shielding particles according to the present invention, the conductivity of the adhesive layer for adhesion containing the heat ray shielding particles is exhibited along a conductive path passing through a contact point of the heat ray shielding particles. Therefore, for example, the conductive path can be partially cut by adjusting an amount of surfactant or a coupling agent to be added, and the conductivity of a layer can be easily reduced to a surface resistance value of $10^6 \Omega/\square$ or more.

[e] Heat Ray Shielding Particle Dispersion Body and Method for Producing the Same.

The heat ray shielding fine particle dispersion body according to the present invention can be obtained by dispersing and including the above-described heat ray shielding fine particles according to the present invention in a thermoplastic resin or a UV curable resin.

The thermoplastic resin is not particularly limited, but any one of one resin or mixture of two or more resins, or copolymer of two or more resins selected from a resin group of polyethylene terephthalate resin, polycarbonate resin, acrylic resin, styrene resin, polyamide resin, polyethylene resin, vinyl chloride resin, olefin resin, epoxy resin, polyimide resin, fluoro resin, ethylene/vinyl acetate copolymer, and polyvinyl acetal resin, is preferable.

Further, an amount of the heat ray shielding particles contained in the above-described heat ray shielding particle dispersion body is 0.001 mass or more and 80.0 mass % or less, more preferably 0.01 mass % or more and 50 mass % or less. If the heat ray shielding fine particles are 0.001 mass % or more, necessary heat ray shielding effect can be easily obtained. Further, when the heat ray shielding fine particles are 80 mass % or less, an amount of the thermoplastic resin component is secured, and strength of the heat ray shielding fine particle dispersion body is secured.

As described above, a heat ray shielding ability per unit weight of the calcium lanthanum boride fine particles according to the present invention is very high. Therefore, the effect is exhibited with a use amount of 1/10 to 1/100 or less, compared with ITO and ATO that are used as conventional heat ray shielding fine particles. Accordingly, a cost can also be reduced compared to the use of expensive ITO. Further, the more dilute dispersion realized in the present invention enables a full coating of fine particles with the resin component etc., which improves abrasion strength and weather resistance (oxidation resistance, water resistance, moisture resistance, and UV resistance).

From a viewpoint of exhibiting a sufficient infrared shielding effect on the heat ray shielding fine particle dispersion body in which the heat ray shielding fine particles containing calcium lanthanum boride fine particles according to the present invention are dispersed and contained, it is preferable that content of the heat ray shielding fine particles per unit projected area contained in the heat ray shielding fine particle dispersion body is 0.01 $g/m^2$ or more and 0.5 $g/m^2$ or less. "Content per unit projected area" means a mass (g) of the heat ray shielding fine particles contained per unit area ($m^2$) through which light passes in a thickness direction, in the heat ray shielding fine particle dispersion body according to the present invention.

When the content of the heat ray shielding fine particles in the dispersion body is 0.01 $g/m^2$ or more, the content of the heat ray shielding particles in the heat ray shielding particle dispersion body is secured, and a predetermined optical effect can be obtained. On the other hand, if the content of the heat ray shielding fine particles in the dispersion body is 0.5 $g/m^2$ or less, it is possible to avoid a situation in which the layer becomes dark due to excessive absorption of light in the visible region.

On the other hand, since an addition amount of the calcium lanthanum boride fine particles is controlled, the absorption of the visible light region can be freely controlled. Therefore, applications to brightness adjustment, privacy protection, etc., are possible.

Further, the present invention will be specifically described hereafter by way of examples, but the present invention is not limited to these examples.

Optical properties of the dispersion liquid and the layer according to this embodiment were measured as follows. The transmittance (every 5 nm) in a wavelength range from 300 nm to 2600 nm was measured using a spectrophotometer (U-4100 manufactured by Hitachi High-Tech Co., Ltd.), according to JIS R 3106. Some of the dispersion liquid samples have absorption peaks in the wavelength range above 2600 nm, and therefore the transmittance of light up to a wavelength of 20 μm was measured by KBr method using a Fourier transform infrared spectrometer (FTIR).

An average dispersed particle size was measured using a particle size distribution analyzer (Nanotrac UPA manufactured by Nikkiso Co., Ltd.).

Regarding a particle shape of the produced heat ray shielding fine particles, scattering intensity of the heat ray shielding particles diluted and dispersed in solvent IPA was measured using a small angle X-ray scattering method, and using NANOSTAR 2D SAXS measurement system manufactured by Bruker AXS. Then, a relationship between scattering vector $q=4\pi \sin \theta/\lambda$ and scattering intensity I (q) was subjected to double-logarithmic plotting to determine and evaluate a slope Ve of the straight line.

When the shape of each heat ray shielding fine particle is a flat cylindrical shape or a flat spheroid, the aspect ratio (long axis to short axis ratio d/h) was evaluated by direct measurement for 50 particles in a transmission electron microscope.

Example 1

Calcium oxide CaO, lanthanum oxide $La_2O_3$, boron carbide $B_4C$ were weighed such that Ca:La=1:3, (Ca+La):B=1:6 (atomic ratio), and the mixture was sufficiently mixed with a small vacuum grinder to obtain a mixed powder. The obtained mixed powder was put in a covered carbon crucible which can degas a product gas such as carbon oxide gas and moisture, and placed in a vertical vacuum baking furnace, and heated up at a rate of 300° C./h in vacuum to 1650° C. After holding at 1650° C. for 18 hours, the power of the furnace was turned off and the temperature was allowed to cool spontaneously to room temperature to obtain a powder.

An appearance of the obtained powder was dark blue purple, and the XRD measurement indicated a single-phase diffraction pattern of body-centered cubic phase which was the same as that of $LaB_6$. When composition analysis was performed by SEM-EDX, results around Ca:La:B=1:3:24 (atomic ratio) were obtained almost uniformly among the particles. Accordingly, it was confirmed that particles having a $Ca_{0.25}La_{0.75}B_6$ composition were produced.

The mixture of 2 mass % of the obtained $Ca_{0.25}La_{0.75}B_6$ fine particles, 4 mass % of a polymer dispersant, and 94 mass % of toluene, and 0.3 mm$\phi ZrO_2$ beads, were charged in a paint shaker, pulverized and dispersed for 24 hours to obtain a $Ca_{0.25}La_{0.75}B_6$ dispersion liquid. The average dispersed particle size of this $Ca_{0.25}La_{0.75}B_6$ dispersion liquid was measured to be 43 nm.

Separately, 2 mass % of the obtained $Ca_{0.25}La_{0.75}B_6$ fine particles and 98 mass % of the IPA solvent were charged in a paint shaker, dispersed for 24 hours, and stabilized with a small amount of coupling agent. For this sample a small angle X-ray scattering measurement was employed and $q=4\pi \sin \theta/\lambda$ and the scattering intensity I (q) were double-logarithmically plotted to evaluate the particle shape. Ve=−3.3 was obtained, and the shape was found to be strongly disc-like.

Further, the particle shape of the obtained $Ca_{0.25}La_{0.75}B_6$ particles was observed in a transmission electron microscope and the long and short axes of 50 particles were measured. The average shape was determined to be a disc-like cylinder or a flat spheroid with an aspect ratio d/h=4.4.

Next, the optical properties of the $Ca_{0.25}La_{0.75}B_6$ dispersion liquid were measured. Specifically, the following procedure was taken.

In the above-described $Ca_{0.25}La_{0.75}B_6$ dispersion liquid, toluene was added, and the mixture was diluted to a concentration of 0.002 mass %, and shaken well to obtain a diluted solution. Thereafter, the diluted solution was put in a glass cell of 1 cm in optical path length, and its transmittance curve was measured with a Hitachi High-Tech Co., Ltd. U-4000 spectrometer. Visible light transmittance and solar transmittance were obtained based on JIS R 3106, and a bottom wavelength of the transmittance profile due to absorption was obtained. At this time, a baseline of the spectrometer was obtained using a sample filled with toluene in the same glass cell.

On the other hand, a haze of the diluted solution was measured using a haze meter manufactured by Murakami Color Research Laboratory.

The result showed a transmission profile in which the transmittance in the visible light region was high and a valley was present due to strong absorption at a wavelength of 1239 nm in the near infrared region. At the haze value of 1.5%, the visible light transmittance (VLT) was measured to be 72.3% and the solar transmittance (ST) was measured to be 44.6%.

The measurement results indicated that, when comparing the decrease in ST with respect to equivalent VLT, the heat ray shielding properties of $Ca_{0.25}La_{0.75}B_6$ according to the present invention are superior to the heat ray shielding properties of $LaB_6$ according to the conventional technique (see below, Comparative Example 1).

Example 2

Calcium oxide CaO, lanthanum oxide $La_2O_3$, and sodium borohydride $NaBH_4$ were weighed such that Ca:La=3:5, (Ca+La):B=1:6 (atomic ratio), and the mixture was sufficiently mixed with a small vacuum grinder to obtain a mixed powder. The obtained mixed powder was put in a covered carbon crucible, placed in a vertical vacuum baking furnace, and heated up at a rate of 300° C./h in vacuum to 1250° C. After holding at 1250° C. for 4 hours, the power of the furnace was turned off and the temperature was allowed to cool spontaneously to room temperature to obtain a powder.

An appearance of the obtained powder was dark blue purple, and the XRD measurement indicated a single-phase diffraction pattern of body-centered cubic single phase which was the same as that of $LaB_6$.

When composition analysis was performed by SEM-EDX, results of around Ca:La:B=3:5:48 (atomic ratio) were obtained almost uniformly among the particles. Accordingly, it was confirmed that particles having a $Ca_{0.37}La_{0.625}B_6$ composition were produced.

The mixture of 2 mass % of the obtained $Ca_{0.375}La_{0.625}B_6$ fine particles, 4 mass % of a polymer dispersant, 94 mass % of toluene, and 0.3 mm$\phi ZrO_2$ beads, were charged in a paint shaker, pulverized and dispersed for 24 hours to produce a $Ca_{0.375}La_{0.625}B_6$ dispersion liquid. The average dispersed particle size of this $Ca_{0.375}La_{0.625}B_6$ dispersion liquid was measured to be 39 nm.

Further, when the particle shape of the fine particles was evaluated in the same manner as in Example 1, Ve=−3.1 was obtained, and the shape was found to be strongly disc-like.

Next, the optical properties of the $Ca_{0.375}La_{0.625}B_6$ dispersion liquid were measured in the same manner as in Example 1. The result shows a transmission profile in which the transmittance in the visible light region is high and a valley is present due to strong absorption at a wavelength of 1360 nm in the near infrared region. Further, when the haze value was 1.4%, the visible light transmittance (VLT) was measured to be 71.6% and the solar transmittance (ST) was measured to be 44.3%.

The measurement results indicated that, when comparing the decrease in ST with respect to equivalent VLT, the heat ray shielding properties of $Ca_{0.375}La_{0.625}B_6$ according to the present invention are superior to the heat ray shielding properties of $LaB_6$ according to a conventional technique (see below, Comparative Example 1).

Comparative Example 1

Lanthanum oxide $La_2O_3$ and boron carbide $B_4C$ were weighed such that La:B=1:6 (atomic ratio), and the mixture was sufficiently mixed with a small vacuum grinder to obtain a mixed powder. The obtained mixed powder was put in a covered carbon crucible, placed in a vertical vacuum baking furnace, and heated up at a rate of 300° C./h in vacuum to 1500° C. After holding at 1500° C. for 8 hours, the power of the furnace was turned off and the temperature was allowed to cool spontaneously to room temperature to obtain a powder.

An appearance of the obtained powder was dark blue purple, and the XRD measurement indicated a single-phase diffraction pattern of body-centered cubic single phase which was in agreement with $LaB_6$ including the lattice constants. When composition analysis was performed by SEM-EDX, results of around La:B=1:6 (atomic ratio) were obtained irrespective of the particles. Accordingly, it was confirmed that particles having a $LaB_6$ composition were produced.

The mixture of 2 mass % of the obtained $LaB_6$ fine particles, 4 mass % of a polymer dispersant, 94 mass % of toluene, and 0.3 mm$\phi ZrO_2$ beads, were charged in a paint shaker, pulverized and dispersed for 24 hours to produce a $LaB_6$ dispersion liquid. The average dispersed particle size of this $LaB_6$ dispersion liquid was measured to be 28 nm.

Further, when the particle shape of the fine particles was evaluated in the same manner as in Example 1, Ve=−3.1 was obtained, and the shape was found to be strongly disc-like.

Next, the optical properties of the $LaB_6$ dispersion liquid were measured in the same manner as in Example 1. The result shows a transmission profile in which transmittance in the visible light region is high and a valley is present due to strong absorption at a wavelength of 1004 nm in the near infrared region.

Further, when the haze value was 0.9%, visible light transmittance (VLT) was measured to be 68.6% and solar transmittance (ST) was measured to be 47.9%.

The measurement results indicated that when comparing with $Ca_{0.25}La_{0.75}B_6$ according to Example 1 and $Ca_{0.375}La_{0.625}B_6$ according to Example 2, VLT is lower and ST is higher, and the heat ray shielding properties of $LaB_6$ according to Comparative Example 1 are inferior to the heat ray shielding properties of materials of Examples 1 and 2.

Comparative Example 2

Calcium oxide CaO and boron carbide $B_4C$ were weighed such that Ca:B=1:6 (atomic ratio), and the mixture was sufficiently mixed with a small vacuum grinder to obtain a mixed powder. The obtained mixed powder was placed in a vacuum furnace and heated up at a rate of 300° C./h in vacuum to 1500° C. After holding at 1500° C. for 8 hours, the power of the furnace was turned off and the temperature was allowed to cool spontaneously to room temperature to obtain a powder.

An appearance of the obtained powder was gray, and the XRD measurement indicated a single-phase diffraction pattern of body-centered cubic single phase which was in agreement with that of $CaB_6$ including the lattice constants. Further, when composition analysis was performed by SEM-EDX, results of around Ca:B=1:6 were obtained irrespective of the particles. Accordingly, it was confirmed that particles having a $CaB_6$ composition were produced.

The mixture of 2 mass % of the obtained $CaB_6$ fine particles, 4 mass % of a polymer dispersant, 94 mass % of toluene, and 0.3 mmϕ$ZrO_2$ beads, were charged in a paint shaker, pulverized and dispersed for 24 hours to produce a $CaB_6$ dispersion liquid. The average dispersed particle size of this $CaB_6$ dispersion liquid was measured to be 82 nm.

Further, when the particle shape of the fine particles was evaluated in the same manner as in Example 1, Ve=−3.2 was obtained, and the shape was found to be strongly disc-like.

Next, the optical properties of the $CaB_6$ dispersion liquid were measured in the same manner as in Example 1. As a result, a wide range of high transmittance in the visible light region and a weak absorption in the infrared range were observed. The bottom of the transmittance due to absorption was apparently on the long wavelength side beyond 2600 nm. Therefore, FTIR measurement was employed to find that the absorption bottom was located at a wavelength of 5126 nm in the mid-infrared region.

Further, when the haze value was 2.5%, VLT was measured to be 73.7% and ST was measured to be 62.8%.

From the measurement result, it was found that regarding $CaB_6$ according to Comparative Example 2, although VLT is high, ST is much higher, and the material has a very weak heat ray shielding effect as compared with $Ca_{0.25}La_{0.75}B_6$ according to Example 1 and $Ca_{0.375}La_{0.625}B_6$ according to Example 2.

Example 3

The same procedure as in Example 1 was followed to produce calcium lanthanum boride fine particles, except that calcium oxide CaO, lanthanum oxide $La_2O_3$, and boron carbide $B_4C$ were weighed such that Ca:La=1:1, (Ca+La):B=1:6 (atomic ratio).

An appearance of the obtained powder was grayish blue, and the XRD measurement indicated a single-phase diffraction pattern of body-centered cubic single phase which was in agreement with that of $LaB_6$. Further, when composition analysis was performed by SEM-EDX, results of around Ca:La:B=1:1:12 (atomic ratio) were obtained irrespective of the particles. Accordingly, it was confirmed that particles having a $Ca_{0.5}La_{0.5}B_6$ composition were produced.

The same procedure as in Example 1 was followed to produce $Ca_{0.5}La_{0.5}B_6$ dispersion liquid, and the dispersed particle size was measured to be 61 nm.

Further when the particle shape of the fine particles was evaluated in the same manner as in Example 1, Ve=−3.1 was obtained, and the shape was found to be strongly disc-like.

Next, optical properties of the $Ca_{0.5}La_{0.5}B_6$ dispersion liquid were measured in the same manner as in Example 1. The result shows a transmission profile in which transmittance in the visible light region is high and a valley is present due to strong absorption at a wavelength of 1508 nm in the near infrared region. Further, when the haze value was 1.9%, the visible light transmittance (VLT) was measured to be 72.8% and the solar transmittance (ST) was measured to be 48.2%.

The measurement results indicated that, when comparing the decrease degree in ST with respect to equivalent VLT, the heat ray shielding properties of $Ca_{0.5}La_{0.5}B_6$ according to the present invention are slightly superior to the heat ray shielding properties of $LaB_6$ according to the conventional technique (see above, Comparative Example 1).

Example 4

The same procedure as in Example 1 was followed to produce calcium lanthanum boride fine particles, except that calcium oxide CaO, lanthanum oxide $La_2O_3$, and boron carbide $B_4C$ were weighed such that Ca:La=3:1, (Ca+La):B=1:6 (atomic ratio).

An appearance of the obtained powder was blue gray, and XRD measurement indicated a single-phase diffraction pattern of body-centered cubic single phase which was in agreement with that of $LaB_6$. Further, when composition analysis was performed by SEM-EDX, results of around Ca:La:B=3:1:24 (atomic ratio) were obtained irrespective of the particles. Accordingly, it was confirmed that particles having a $Ca_{0.75}La_{.25}B_6$ composition were produced.

The same procedure as in Example 1 was followed to produce $Ca_{0.75}La_{0.25}B_6$ dispersion liquid, and the dispersed particle size was measured to be 68 nm.

Further when the particle shape of the fine particles was evaluated in the same manner as in Example 1, Ve=−3.2 was obtained, and the shape was found to be strongly disc-like.

Next, optical properties of the $Ca_{0.75}La_{0.25}B_6$ dispersion liquid were measured in the same manner as in Example 1. The result shows a transmission profile in which transmittance in the visible light region is high, and the absorption wavelength is shifted to considerably long wavelength side, with the bottom of the transmittance due to absorption at a wavelength of 1818 nm in the near-infrared region, and absorption strength was weaker than in Example 1. Further, when the haze value was 1.8%, the visible light transmittance (VLT) was measured to be 74.5% and the solar transmittance (ST) was measured to be 56.0%.

The measurement results indicated that, when comparing the decrease degree in ST with respect to equivalent VLT, a visible light transmittance ability of $Ca_{0.75}La_{0.25}B_6$ according to the present invention is superior to the visible light transmittance ability of $LaB_6$ according to the conventional technique (see above, Comparative Example 1).

Comparative Example 3

95 mass % of $Ca_{0.375}La_{0.625}B_6$ powder obtained in Example 2, 5 mass % of B powder, and a high frequency thermal plasma reactor whose structure is shown in FIG. 2 were prepared. The $Ca_{0.375}La_{0.625}B_6$ powder and the B powder were introduced into the high frequency thermal plasma reactor by a carrier gas, to produce calcium lanthanum boride fine particles. At this time, atmosphere was Ar at 1 atm, and high frequency plasma was generated at 4 MHz and 25 kW.

According to EDX composition analysis of nano-sized fine particles collected by a filter, the atomic ratio thereof was Ca/La=0.61, and it was confirmed that $Ca_{0.379}La_{0.621}B_6$ nano-sized fine particles having a composition substantially similar to that of Example 2 were produced.

The same procedure as in Example 1 was followed to produce $Ca_{0.379}$ $La_{0.621}B_6$ dispersion liquid, and the dispersed particle size was measured to be 28 nm.

Further when the particle shape of the fine particles was evaluated in the same manner as in Example 1, Ve=−3.9 was obtained, and the shape was found to be almost spherical.

Further, the particle shape of the obtained $Ca_{0.379}La_{0.621}B_6$ particles was observed in a transmission electron microscope and the long and short axes of 50 particles were measured. The average shape was determined to be a sphere with an aspect ratio d/h=1.2.

Next, optical properties of the $Ca_{0.379}La_{0.621}B_6$ dispersion liquid were measured in the same manner as in Example 1. As a result, although this dispersion liquid has a composition similar to that of Example 2, the absorption wavelength is shifted to a considerably short wavelength side, the bottom of the transmittance due to absorption was at a wavelength of 818 nm, which is a limit of the near infrared region, and the wavelength range of absorption was narrow and very sharp. Accordingly, the absorption strength was much weaker than in Example 2, and when the haze value was 1.3%, the visible light transmittance (VLT) was measured to be 71.5% and the solar transmittance (ST) was measured to be 52.6%.

From the measurement result, it was found that solar transmittance is high and solar radiation shielding performance is insufficient.

Comparative Example 4

95 mass % of $Ca_{0.5}La_{0.5}B_6$ powder obtained in Example 3, 5 mass % of B powder, and a high frequency thermal plasma reactor whose structure is shown in FIG. 2 were prepared. Then, the same procedure as in Comparative Example 3 was followed to produce calcium lanthanum boride fine particles.

According to EDX composition analysis of nano-sized fine particles collected by a filter, the atomic ratio thereof is Ca/La=1.02, and it was confirmed that $Ca_{0.495}La_{0.505}B_6$ nano-sized fine particles having a composition substantially similar to that of Example 3 were produced.

Further the same procedure as in Example 1 was followed to produce $Ca_{0.495}La_{0.505}B_6$ dispersion liquid, and a dispersed particle size was measured to be 33 nm.

Also, the same procedure as in Example 1 was followed to evaluate the particle shape of these fine particles, and Ve=−3.9 was obtained, and the shape was found to be almost spherical.

Next, optical properties of the $Ca_{0.495}La_{0.505}B_6$ dispersion liquid were measured in the same manner as in Example 1. As a result, although this dispersion liquid has a composition similar to that of Example 3, the absorption wavelength is shifted to a considerably short wavelength side, the bottom of the transmittance due to absorption was at a wavelength of 878 nm as a limit in the near infrared region, and the wavelength range of absorption was narrow and very sharp. Accordingly, the absorption strength is much weaker than in Example 3, and when the haze value was 1.6%, the visible light transmittance (VLT) was measured to be 69.4% and the solar transmittance (ST) was measured to be 52.4%.

From the measurement result, it was found that solar transmittance is high and solar radiation shielding performance is insufficient.

Comparative Example 5

95 mass % of $Ca_{0.75}La_{0.25}B_6$ powder obtained in Example 4, 5 mass % of B powder, and a high frequency thermal plasma reactor whose structure is shown in FIG. 2 were prepared. Then, the same procedure as in Comparative Example 3 was followed to produce calcium lanthanum boride fine particles.

According to EDX composition analysis of nano-sized fine particles collected by a filter, the atomic ratio thereof was Ca/La=3.03, and it was confirmed that $Ca_{0.75}La_{0.25}B_6$ nano-sized fine particles having a composition substantially similar to that of Example 4 were produced.

The same procedure as in Example 1 was followed to produce $Ca_{0.75}La_{0.25}B_6$ dispersion liquid, and the dispersed particle size was measured to be 25 nm.

Further when the particle shape of the fine particles was evaluated in the same manner as in Example 1, Ve=−3.9 was obtained, and the shape was found to be almost spherical.

Next, optical properties of the $Ca_{0.75}La_{0.25}B_6$ dispersion liquid were measured in the same manner as in Example 1. As a result, although this dispersion liquid had a composition similar to that of Example 4, the bottom of the transmittance due to absorption was at a wavelength of 1117 nm in the near infrared region, and the wavelength range of absorption was narrow and very sharp. Accordingly, the absorption strength was much weaker than in Example 4, and when the haze value was 1.3%, the visible light transmittance (VLT) was measured to be 70.5% and the solar transmittance (ST) was measured to be 56.7%.

From the measurement result, it was found that solar transmittance is high and solar radiation shielding performance is insufficient.

Example 5

A mixed powder was obtained by sufficiently mixing the $Ca_{0.25}La_{0.75}B_6$ powder obtained in Example 1 and the $Ca_{0.5}La_{0.5}B_6$ powder obtained in Example 3 at an atomic ratio of 3:1.

2 mass % of the obtained mixed powder, 4 mass % of polymeric dispersant, and 94 mass % of toluene were mixed and charged in a glass bottle for a paint shaker together with 0.3 mm $ZrO_2$ beads, and pulverized and dispersed for 24 hours, to prepare a dispersion liquid of the mixed powder. An average dispersed particle size of this dispersion liquid was measured to be 47 nm.

Next, optical properties of the dispersion liquid were measured in the same manner as in Example 1. As a result, a very good transmission profile for the dispersion liquid as a heat ray shielding material was obtained as follows: this dispersion liquid had a broad bottom with a wide range of strong absorption, with a bottom wavelength of 1406 nm in the near infrared region, in addition to high transmittance in the visible light.

Further, when the haze value was 1.6%, the visible light transmittance (VLT) was measured to be 73.1% and the solar transmittance (ST) was measured to be 39.2%.

From the measurement result, it was found that the dispersion liquid according to Example 5 has characteristics considerably superior to the heat ray shielding properties of $LaB_6$ according to the conventional technique (see above, Comparative Example 1).

Example 6

A mixed powder was obtained by sufficiently mixing the $Ca_{0.25}La_{0.75}B_6$ powder obtained in Example 1 and the $Ca_{0.5}La_{0.5}B_6$ powder obtained in Example 3 at an atomic ratio of 2:3.

2 mass % of the obtained mixed powder, 4 mass % of polymeric dispersant, and 94 mass % of toluene were mixed and charged in a glass bottle for a paint shaker together with 0.3 mmΦ $ZrO_2$ beads, and pulverized and dispersed for 24 hours, to prepare a dispersion liquid of the mixed powder. An average dispersed particle size of this dispersion liquid was measured to be 53 nm.

Next, optical properties of the dispersion liquid were measured in the same manner as in Example 1.

The result shows the transmission profile of the dispersion liquid in which the bottom wavelength of the transmittance due to absorption was shifted to the long wavelength side to the wavelength of 1598 nm in the near infrared region, and the transmittance with visible light was high.

Further, when the haze value was 1.7%, the visible light transmittance (VLT) was measured to be 75.2% and the solar transmittance (ST) was measured to be 51.6%.

From the measurement result, it was found that the dispersion liquid according to Example 6 has an excellent visible light transmission performance and good heat ray shielding properties although having a slightly higher solar transmittance, compared with the heat ray shielding properties of $LaB_6$ according to the conventional technique (see above, Comparative example 1).

Example 7

5 mass % of the $Ca_{0.25}La_{0.75}B_6$ powder prepared in Example 1, 90 mass % of toluene, and 5 mass % of polyacrylate dispersant were mixed, and pulverized and dispersed together with 0.3 mmΦ $ZrO_2$ beads by a paint shaker for 24 hours, to prepare a dispersion liquid (Liquid A) with an average dispersed particle size of 56 nm. 10 parts by mass of the liquid A and 100 parts by mass of the UV curable resin for hard coat (solid content 100%) were mixed to obtain a coating liquid for a heat ray shielding layer. The coating liquid for a heat ray shielding layer was applied onto a PET resin film (HPE-50 manufactured by Teijin Ltd.) using a bar coater to form a layer. The obtained coated layer was dried at 60° C. for 30 seconds to evaporate a solvent, and thereafter was cured with a high pressure mercury lamp to obtain a heat ray shielding resin film.

The obtained heat ray shielding resin film had a pale green transmission color tone.

When the optical properties of the obtained heat ray shielding resin film was measured, it was found that the visible light transmittance was 71.3% and the light in the visible light region was sufficiently transmitted. The solar transmittance was 45.1%, and it was found that about 55% of direct incident light of the sunlight was shielded, and a heat insulation effect was high. Further, the haze was 1.5%, the transparency was high, and an internal condition was clearly confirmed from the outside through the heat ray shielding resin film.

On the other hand, when a surface resistance value of the obtained heat ray shielding resin film was measured by Hiresta (manufactured by Mitsubishi Yuka Co., Ltd.), it was confirmed to be $7\times10^9\Omega/\square$ or more and to have no problem in radio wave transmission.

Example 8

9 mass % of the $Ca_{0.75}La_{0.25}B_6$ powder prepared in Example 4, 86 mass % of toluene, and 5 mass % of polyacrylate dispersant were mixed, and pulverized and dispersed together with 0.3 mmΦ $ZrO_2$ beads by a paint shaker for 24 hours, to prepare a dispersion liquid (Liquid B) with an average dispersed particle size of 71 nm.

10 parts by mass of the liquid B and 100 parts by mass of the UV curable resin for hard coat (solid content 100%) were mixed to obtain a coating liquid for a heat ray shielding layer. The coating liquid for a heat ray shielding layer was applied onto a PET resin film (HPE-50 manufactured by Teijin Ltd.) using a bar coater to form a layer. The obtained coated layer was dried at 60° C. for 30 seconds to evaporate a solvent, and then cured with a high pressure mercury lamp to obtain a heat ray shielding resin film.

The obtained heat ray shielding resin film had a light blue transmission color tone.

When the optical properties of the obtained heat ray shielding resin film was measured, it was found that the visible light transmittance was 74.2% and the light in the visible light region was sufficiently transmitted. The solar transmittance was 52.7%, and it was found that about 47% of direct incident light of the sunlight was shielded, and the heat insulation effect was high. Further, the haze was 1.8%, the transparency was high, and an internal condition was clearly confirmed from the outside through the heat ray shielding resin film.

On the other hand, when a surface resistance value of the obtained heat ray shielding resin film was measured by Hiresta (manufactured by Mitsubishi Yuka Co., Ltd.), it was confirmed to be $5\times10^{10}\Omega/\square$ or more and to have no problem in radio wave transmission.

TABLE 1

| | Composition | Ca content x | Fine particle shape a (nm) | Ve | Aspect ratio d/h | b (nm) | c (%) | d (%) | Haze (%) |
|---|---|---|---|---|---|---|---|---|---|
| Ex. 1 | $Ca_{0.25}La_{0.75}B_6$ | 0.25 | 43 | −3.3 | 4.4 | 1239 | 72.3 | 44.6 | 1.5 |
| Ex. 2 | $Ca_{0.375}La_{0.625}B_6$ | 0.375 | 39 | −3.1 | — | 1360 | 71.6 | 44.3 | 1.4 |
| Ex. 3 | $Ca_{0.5}La_{0.5}B_6$ | 0.50 | 61 | −3.1 | — | 1508 | 72.8 | 48.2 | 1.9 |
| Ex. 4 | $Ca_{0.75}La_{0.25}B_6$ | 0.75 | 68 | −3.2 | — | 1818 | 74.5 | 56.0 | 1.8 |
| Ex. 5 | 3 × $Ca_{0.25}La_{0.75}B_6$ + $Ca_{0.75}La_{0.25}B_6$ Mixture | — | 47 | — | — | 1406 | 73.1 | 39.2 | 1.6 |
| Ex. 6 | 2 × $Ca_{0.25}La_{0.75}B_6$ + 3 × $Ca_{0.75}La_{0.25}B_6$ Mixture | — | 53 | — | — | 1598 | 75.2 | 51.6 | 1.7 |
| Com. Ex. 1 | $LaB_6$ | 0.00 | 28 | −3.1 | — | 1004 | 68.6 | 47.9 | 0.9 |
| Com. Ex. 2 | $CaB_6$ | 1.00 | 82 | −3.2 | — | 5126 | 73.7 | 62.8 | 2.5 |
| Com. Ex. 3 | $Ca_{0.379}La_{0.621}B_6$ | 0.379 | 28 | −3.9 | 1.2 | 818 | 71.5 | 52.6 | 1.3 |
| Com. Ex. 4 | $Ca_{0.495}La_{0.505}B_6$ | 0.495 | 33 | −3.9 | — | 878 | 69.4 | 52.4 | 1.6 |
| Com. Ex. 5 | $Ca_{0.75}La_{0.25}B_6$ | 0.75 | 25 | −3.9 | — | 1117 | 70.5 | 56.7 | 1.3 | a = Average dispersed particle size
b = Bottom wavelength due to absorption
c = Visible light transmittance
d = Solar radiation transmittance
Ex. = Example
Com. Ex. = Comparative Example

TABLE 2

| | Composition | Ca content x | a (nm) | Resin film | b (%) | c (%) | Haze d (%) | d (Ω/□) |
|---|---|---|---|---|---|---|---|---|
| Ex. 7 | $Ca_{0.25}La_{0.75}B_6$ | 0.25 | 56 | PET | 71.3 | 45.1 | 1.5 | $7 \times 10^9$ or more |
| Ex. 8 | $Ca_{0.75}La_{0.25}B_6$ | 0.50 | 71 | PET | 74.2 | 52.7 | 1.8 | $5 \times 10^{10}$ or more | a = Average dispersed particle size
b = Visible light transmittance
c = Solar radiation transmittance
d = Surface resistance
Ex. = Example

DESCRIPTION OF SIGNS AND NUMERALS

11 Boron atom
12 Element M
21 Thermal plasma
22 High frequency coil
23 Sheath gas supply nozzle
24 Plasma gas supply nozzle
25 Raw material powder supply nozzle
26 Reaction vessel
27 Suction tube
28 Filter

The invention claimed is:

1. Heat ray shielding fine particles containing calcium lanthanum boride fine particles represented by a general formula $Ca_xLa_{1-x}B_m$,
   wherein a value of x in the general formula is $0.001 \leq x \leq 0.800$, and a value of m is $5.0 \leq m < 6.3$,
   an average dispersed particle size of the calcium lanthanum boride fine particles is 1 nm or more and 800 nm or less,
   a shape of each fine particle of the calcium lanthanum boride fine particles satisfies at least one of the following:
   1) when scattering intensity of the calcium lanthanum boride fine particles diluted and dispersed in a solvent is measured using small-angle X-ray scattering, value Ve of a slope of a straight line is $-3.8 \leq Ve \leq -1.5$, which is obtained by double-logarithmic plotting of a relationship between scattering vector $q = 4\pi \sin\theta/\lambda$ and scattering intensity I(q),
   2) the particle shape is a flat cylindrical (wherein a diameter of the bottom circle is d and a height of the cylinder is h) shape, or a flat spheroidal (wherein a length of the long axis is d and a length of the short axis is h) shape, with a value of aspect ratio d/h being $1.5 \leq d/h \leq 20$.

2. The heat ray shielding fine particles according to claim 1, wherein a value of x in the general formula is $0.100 \leq x \leq 0.625$, and a value of m is $5.0 \leq m < 6.3$.

3. The heat ray shielding fine particles containing the calcium lanthanum boride fine particles of claim 1, which are two or more kinds of calcium lanthanum boride fine particles having different values of x in the above general formula.

4. A heat ray shielding fine particle dispersion liquid, which is a dispersion liquid containing the heat ray shielding particles of claim 1 dispersed in a liquid medium,
   wherein the liquid medium is one or more selected from water, organic solvents, fats and oils, liquid resins, and liquid plasticizers for plastics.

5. The heat ray shielding particle dispersion liquid according to claim 4, wherein the heat ray shielding particles are contained in an amount of 0.02 mass % or more and 20 mass % or less.

6. A coating liquid for a heat ray shielding layer, wherein a binder containing one or more selected from UV curable resin, room temperature curable resin, thermoplastic resin, or partial hydrolysis polymer of alkoxide is added to the heat ray shielding fine particle dispersion liquid according to claim 4, and
   a content of the heat ray shielding particles is 0.8 mass % or more and 10.0 mass % or less.

7. A heat ray shielding layer, which is formed by applying the coating liquid for a heat ray shielding layer of claim 6 on one side or both sides of a base material.

8. A heat ray shielding resin film in which the heat ray shielding layer according to claim 7 is formed on one side or both sides of a base material,
   wherein the base material is a resin film, and resin of the resin film is one or more selected from polycarbonate resin, poly (meth) acrylic ester resin, saturated polyester resin, and cyclic olefin resin.

9. The heat ray shielding resin film according to claim 8, wherein an adhesive layer for adhesion is provided on at least one side of the resin film.

10. The heat ray shielding resin film according to claim 9, wherein the adhesive layer for adhesion contains the heat ray shielding particles.

11. The heat ray shielding resin film according to claim 8, wherein a surface resistance value of the heat ray shielding layer or the adhesive layer for adhesion containing the heat ray shielding particles is $10^6 \Omega/\square$ or more.

12. A heat ray shielding fine particle dispersion body wherein the heat ray shielding fine particles according to claim 1 are dispersed in a thermoplastic resin or a UV curable resin.

13. The heat ray shielding fine particle dispersion body according to claim 12,
    wherein the thermoplastic resin is one of the resins selected from a group of polyethylene terephthalate resin, polycarbonate resin, acrylic resin, styrene resin, polyamide resin, polyethylene resin, vinyl chloride resin, olefin resin, epoxy resin, polyimide resin, fluorine resin, ethylene/vinyl acetate copolymer, and polyvinyl acetal resin,
    or the mixture of two or more resins selected from the above resin group,
    or a copolymer of two or more resins selected from the above resin group.

14. The heat ray shielding fine particle dispersion body according to claim 12, which contains 0.001 mass % or more and 80.0 mass % or less of the heat ray shielding fine particles.

15. The heat ray shielding fine particle dispersion body according to claim 12, wherein the heat ray shielding fine particle dispersion body has a sheet shape, a board shape or a film shape.

16. The heat ray shielding fine particle dispersion body according to claim 12, wherein a content of the heat ray shielding particles is 0.01 g/m² or more and 0.5 g/m² or less per unit projected area contained in the heat ray shielding particle dispersion body.

\* \* \* \* \*